US010117208B2

(12) United States Patent
Seo et al.

(10) Patent No.: US 10,117,208 B2
(45) Date of Patent: Oct. 30, 2018

(54) METHOD FOR DETERMINING UPLINK TRANSMISSION TIMING OF TERMINAL HAVING PLURALITY OF CELLS CONFIGURED THEREIN IN WIRELESS COMMUNICATION SYSTEM, AND APPARATUS USING THE METHOD

(71) Applicant: LG Electronics Inc., Seoul (KR)

(72) Inventors: Dongyoun Seo, Seoul (KR); Joonkui Ahn, Seoul (KR); Yunjung Yi, Seoul (KR); Bonghoe Kim, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/915,987

(22) PCT Filed: Sep. 5, 2014

(86) PCT No.: PCT/KR2014/008362

§ 371 (c)(1),
(2) Date: Mar. 2, 2016

(87) PCT Pub. No.: WO2015/037880

PCT Pub. Date: Mar. 19, 2015

(65) Prior Publication Data

US 2016/0219547 A1 Jul. 28, 2016

Related U.S. Application Data

(60) Provisional application No. 61/930,471, filed on Jan. 22, 2014, provisional application No. 61/906,856,
(Continued)

(51) Int. Cl.
*H04L 5/14* (2006.01)
*H04W 56/00* (2009.01)
*H04W 72/04* (2009.01)

(52) U.S. Cl.
CPC ........... *H04W 56/0045* (2013.01); *H04L 5/14* (2013.01); *H04W 56/0005* (2013.01); *H04W 72/0413* (2013.01)

(58) Field of Classification Search
CPC ................ H04L 5/14; H04W 56/0005; H04W 56/0045; H04W 72/0413
See application file for complete search history.

(56) References Cited

U.S. PATENT DOCUMENTS

2003/0117995 A1 6/2003 Koehn et al.
2011/0051633 A1* 3/2011 Pan .................. H04W 56/0045 370/280

(Continued)

FOREIGN PATENT DOCUMENTS

CN 101572577 A 11/2009
EP 2282468 A1 2/2011

(Continued)

OTHER PUBLICATIONS

Whitlock, R.S.C. et al., "Enhanced timing advance in TDM cellular radio systems," IEEE Electronics Letters, vol. 47, No. 14, Issue 14, Jul. 11, 2011, see p. 1.

*Primary Examiner* — Asad Nawaz
*Assistant Examiner* — Zhaohui Yang
(74) *Attorney, Agent, or Firm* — Dentons US LLP

(57) ABSTRACT

Provided is a method for determining an uplink transmission timing of a terminal having a plurality of cells configured therein, and a terminal using the method in a wireless communication system. The method comprises receiving timing advance (TA) configuration information, and determining an uplink transmission timing for each of the two cells on the basis of the TA configuration information, wherein the plurality of cells comprise a first cell using a frequency division duplex (FDD) frame structure and a second cell using a time division duplex (TDD) frame structure.

6 Claims, 19 Drawing Sheets

Related U.S. Application Data filed on Nov. 20, 2013, provisional application No. 61/875,695, filed on Sep. 10, 2013.

(56) References Cited

U.S. PATENT DOCUMENTS

| | | | | |
|---|---|---|---|---|
| 2012/0008600 | A1* | 1/2012 | Marinier ................. | H04L 5/001 370/336 |
| 2012/0275390 | A1 | 11/2012 | Korhonen et al. | |
| 2013/0064165 | A1* | 3/2013 | Chen ................. | H04W 56/0045 370/312 |
| 2014/0044108 | A1* | 2/2014 | Earnshaw ............. | G01S 5/0063 370/336 |
| 2014/0233535 | A1* | 8/2014 | Zhao ................. | H04W 72/0453 370/336 |

FOREIGN PATENT DOCUMENTS

| | | | |
|---|---|---|---|
| EP | 2706692 | A2 | 3/2014 |
| JP | 2011519232 | A | 6/2011 |
| JP | 2014514787 | A | 6/2014 |
| KR | 1020110008304 | | 1/2011 |
| KR | 101101068 | | 12/2011 |
| WO | 2012041422 | | 4/2012 |
| WO | 12137984 | A1 | 10/2012 |
| WO | 2012153961 | A2 | 11/2012 |
| WO | 2015016609 | A1 | 2/2015 |

* cited by examiner

METHOD FOR DETERMINING UPLINK TRANSMISSION TIMING OF TERMINAL HAVING PLURALITY OF CELLS CONFIGURED THEREIN IN WIRELESS COMMUNICATION SYSTEM, AND APPARATUS USING THE METHOD

This application is a 35 USC § 371 National Stage entry of International Application No. PCT/KR2014/008362 filed Sep. 5, 2014, and claims priority to U.S. Provisional Application Nos. 61/875,695 filed Sep. 10, 2013; 61/906,856 filed Nov. 20, 2013 and 61/930,471 filed Jan. 22, 2014, all of which are hereby incorporated by reference in their entireties as if fully set forth herein.

BACKGROUND OF THE INVENTION

Field of the Invention

The present invention relates to wireless communications, and more particularly, to a method of determining an uplink transmission timing of a user equipment (UE) having a plurality of cells configured therefor.

Related Art

Long Term Evolution (LTE) based on 3$^{rd}$ Generation Partnership Project (3GPP) Technical Specification (TS) Release 8 is the leading next-generation mobile communication standard.

As disclosed in 3GPP TS 36.211 V8.7.0 (2009 May) "Evolved Universal Terrestrial Radio Access (E-UTRA); Physical Channels and Modulation (Release 8)", in LTE, a physical channel can be divided into a Physical Downlink Shared Channel (PDSCH) and a Physical Downlink Control Channel (PDCCH), that is, downlink channels, and a Physical Uplink Shared Channel (PUSCH) and a Physical Uplink Control Channel (PUSCH), that is, uplink channels.

A PUCCH is an uplink control channel used to send uplink control information, such as a Hybrid Automatic Repeat reQuest (HARQ), an acknowledgement/not-acknowledgement (ACK/NACK) signal, a Channel Quality Indicator (CQI), and a Scheduling Request (SR). Currently, 3GPP LTE-Advanced (LTE-A) as an evolved version of 3GPP LTE is progressing.

Meanwhile, a conventional wireless communication system uses either of time division duplex (TDD) and frequency division duplex (FDD). TDD is a technique where the same frequency band is used for an uplink and a downlink at different times. FDD is a technique where different frequency bands are used for an uplink and a downlink. FDD uses two different frequency bands to allow uplink and downlink transmissions simultaneously, whereas TDD does not allow simultaneous uplink and downlink transmissions.

When FDD is used, in which a downlink and an uplink use the same frequency band, resources are allocated to the downlink and the uplink at a fixed ratio of 1:1. However, when data traffic is concentrated in either of the downlink and the uplink, the resources may not be efficiently used.

FDD needs new communication methods. When an advanced user equipment (UE) using a new communication method coexists with a conventional UE, communication standards based on the conventional FDD technique need to be changed.

Meanwhile, two cells may be configured for a UE. For example, an FDD cell using FDD and a TDD cell using TDD may be configured for a UE. A timing advance (TA) value, which indicates how much earlier a conventional uplink radio frame is transmitted than a downlink radio frame, is determined on a duplexing mode used in a cell on the assumption that cells using the same duplexing mode are aggregated for one UE.

Thus, it is necessary to modify a conventional TA determination method for a wireless communication system in which cells using different duplexing modes may be aggregated.

SUMMARY OF THE INVENTION

The present invention provides a method of determining an uplink transmission timing of a user equipment having a plurality of cells configured therefor and an apparatus using the method.

In one aspect, provided is a method for determining an uplink transmission timing of a user equipment having a plurality of cells configured therefor in a wireless communication system. The method includes receiving timing advance (TA) configuration information and determining an uplink transmission timing for each of the two cells on the basis of the TA configuration information. The plurality of cells comprises a first cell using a frequency division duplex (FDD) frame structure and a second cell using a time division duplex (TDD) frame structure.

The uplink transmission timing may be determined on the basis of an offset value determined according to the TA configuration information and a frame structure.

When the first cell is a primary cell and the second cell is a secondary cell, an uplink transmission timing of the first cell may be determined on the basis of the TA configuration information, and an uplink transmission timing of the second cell may be configured to be the same as the transmission timing of the first cell.

The primary cell may be a serving cell in which a physical uplink control channel (PUCCH) is transmitted.

When both the first cell and the second cell are secondary cells, uplink transmission timings of the first cell and the second cell are determined by applying the same offset value regardless of frame structures of the first cell and the second cell.

In another aspect, provided is a user equipment. The user equipment includes a radio frequency (RF) unit configured to transmit and receive a radio signal and a processor connected to the RF unit. The processor receives timing advance (TA) configuration information and determines an uplink transmission timing for each of the two cells on the basis of the TA configuration information, and the plurality of cells comprises a first cell using a frequency division duplex (FDD) frame structure and a second cell using a time division duplex (TDD) frame structure.

Although cells using different duplexing modes are configured for each user equipment in a wireless communication system, the UE determines an uplink transmission timing in view of characteristics of the aggregated cells, thereby efficiently achieving uplink synchronization.

DESCRIPTION OF EXEMPLARY EMBODIMENTS

User Equipment (UE) can be fixed or can have mobility. UE can also be called another term, such as a Mobile Station (MS), a Mobile Terminal (MT), a User Terminal (UT), a Subscriber Station (SS), a wireless device, a Personal Digital Assistant (PDA), a wireless modem, or a handheld device.

The BS commonly refers to a fixed station that communicates with UE. The BS can also be called another tem, such as an evolved-NodeB (eNodeB), a Base Transceiver System (BTS), or an access point.

Communication from a BS to UE is called downlink (DL), and communication from UE to a BS is called uplink (UL). A wireless communication system including a BS and UE can be a Time Division Duplex (TDD) system or a Frequency Division Duplex (FDD) system. A TDD system is a wireless communication system that performs UL and DL transmission/reception using different times in the same frequency band. An FDD system is a wireless communication system that enables UL and DL transmission/reception at the same time using different frequency bands. A wireless communication system can perform communication using radio frames.

Figure 1:
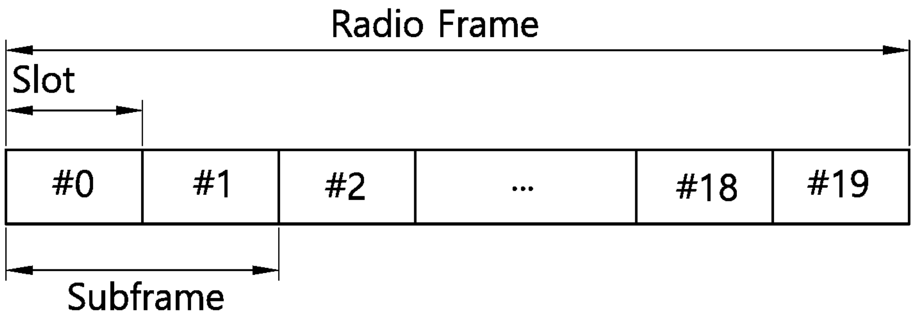
FIG. 1 shows the structure of an FDD radio frame.

FIG. 1 shows the structure of an FDD radio frame.

The FDD radio frame includes 10 subframes, and one subframe includes two consecutive slots. The slots within the radio frame are assigned indices 0~19. The time that is taken for one subframe to be transmitted is called a Transmission Time Interval (TTI). A TTI can be a minimum scheduling unit. For example, the length of one subframe can be 1 ms, and the length of one slot can be 0.5 ms. Hereinafter, the FDD radio frame may be simply referred to as an FDD frame.

Figure 2:
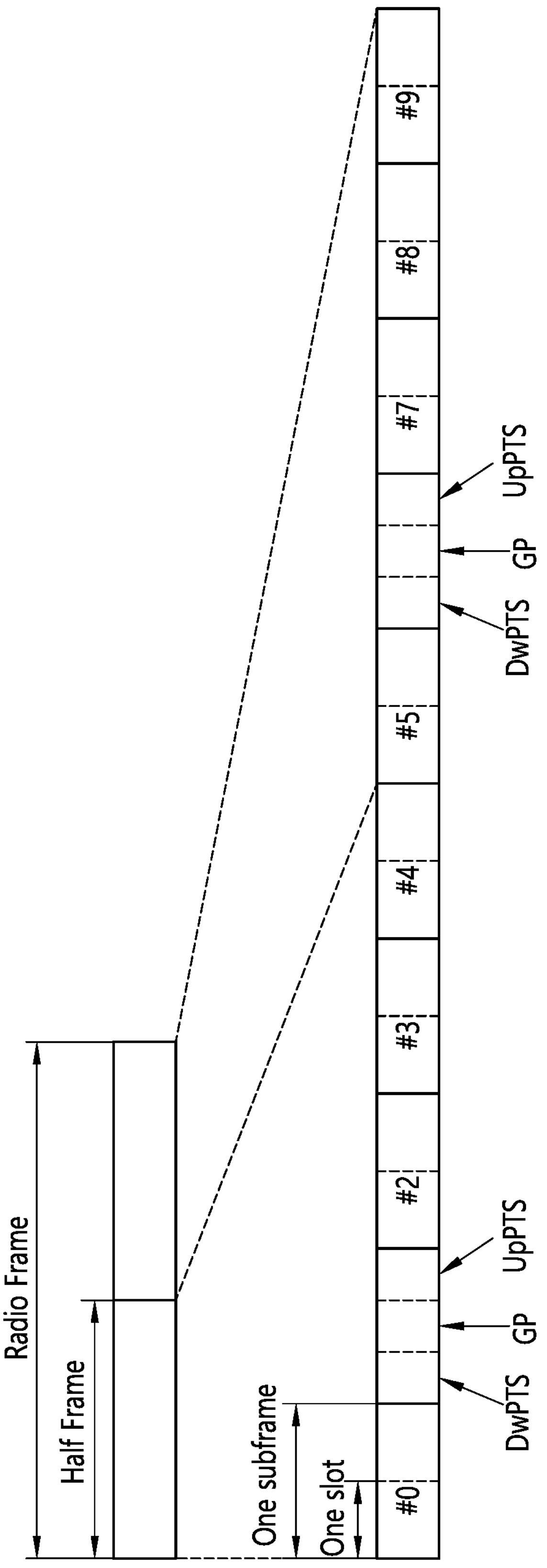
FIG. 2 shows the structure of a TDD radio frame.

FIG. 2 shows the structure of a TDD radio frame.

Referring to FIG. 2, a downlink (DL) subframe and an uplink (UL) subframe coexist in a TDD radio frame used in TDD. Table 1 shows an example of a UL-DL configuration of the radio frame.

TABLE 1

| Uplink-downlink configuration | Downlink-to-uplink switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | U |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' indicates a DL subframe, 'U' indicates a UL subframe, and 'S' indicates a special subframe. When a UL-DL configuration is received from a BS, a UE can be aware of whether each subframe in a radio frame is a DL subframe or a UL subframe. Hereinafter, reference can be made to Table 1 for a UL-DL configuration N (N is any one of 0 to 6).

In the TDD frame, a subframe having an index #1 and an index #6 may be a special subframe, and includes a downlink pilot time slot (DwPTS), a guard period (GP), and an uplink pilot time slot (UpPTS). The DwPTS is used in initial cell search, synchronization, or channel estimation in UE. The UpPTS is used for channel estimation in a BS and for the uplink transmission synchronization of UE. The GP is an interval in which interference occurring in UL due to the multi-path delay of a DL signal between UL and DL is removed. Hereinafter, the TDD radio frame may be simply referred to as a TDD frame.

Figure 3:
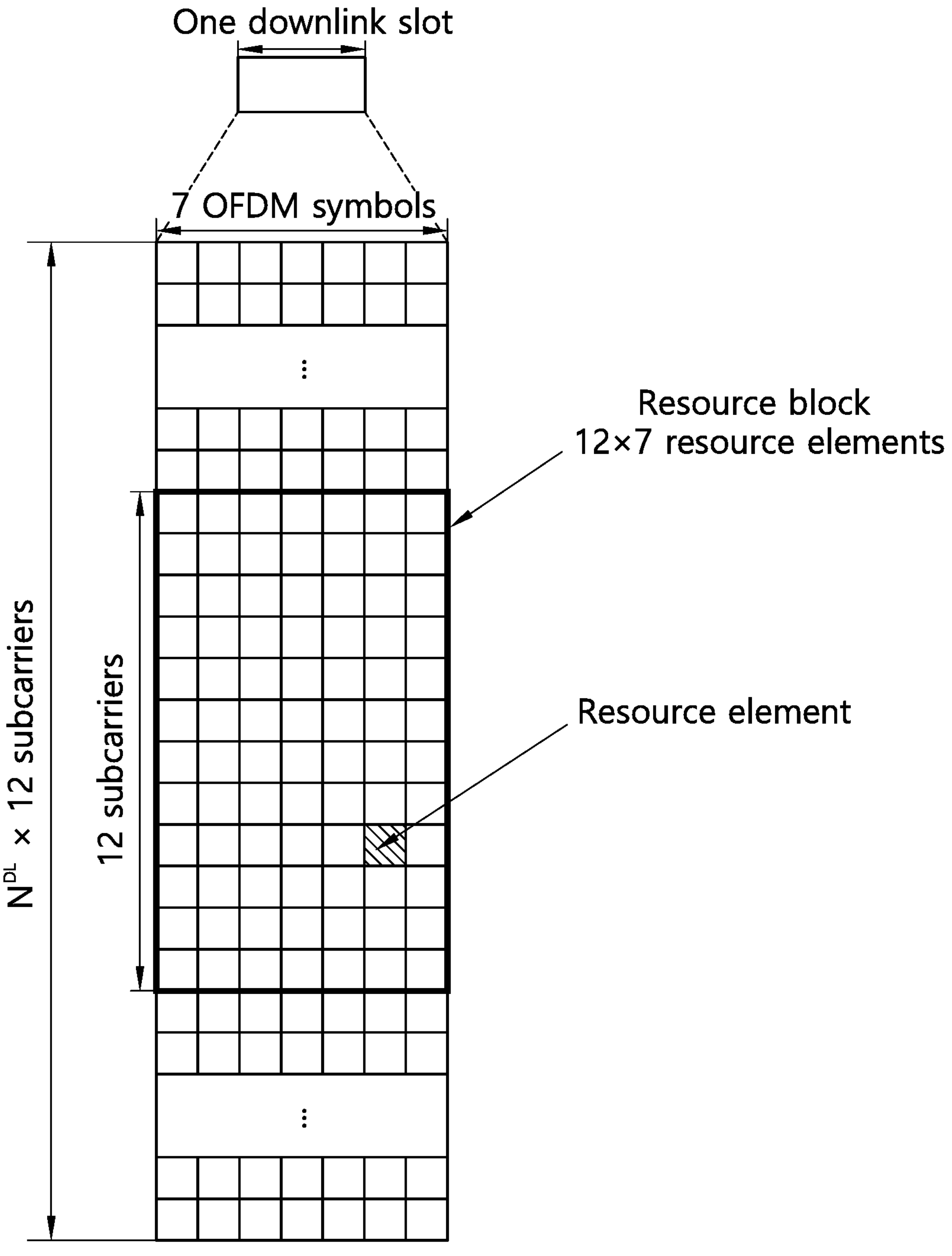
FIG. 3 shows an example of a resource grid for one downlink slot.

FIG. 3 shows an example of a resource grid for one downlink slot.

Referring to FIG. 3, the downlink slot includes a plurality of Orthogonal Frequency Division Multiplexing (OFDM) symbol in the time domain and includes $N_{RB}$ Resource Blocks (RBs) in the frequency domain. The RBs includes one slot in the time domain and a plurality of consecutive subcarrier in the frequency domain in a resource allocation unit. The number of RBs $N_{RB}$ included in the downlink slot depends on a downlink transmission bandwidth $N^{DL}$ configured in a cell. For example, in an LTE system, the $N_{RB}$ can be any one of 6 to 110. An uplink slot can have the same structure as the downlink slot.

Each element on the resource grid is called a Resource Element (RE). The RE on the resource grid can be identified by an index pair (k,l) within a slot. Here, k (k=0, . . . , $N_{RB}$×12−1) is a subcarrier index within the frequency domain, and l (l=0, . . . , 6) is an OFDM symbol index within the time domain.

Although 7×12 REs including 7 OFDM symbols in the time domain and 12 subcarrier in the frequency domain have been illustrated as being included in one RB in FIG. 3, the number of OFDM symbols and the number of subcarriers within an RB are not limited thereto. The number of OFDM symbols and the number of subcarriers can be changed in various ways depending on the length of a CP, frequency spacing, etc. In one OFDM symbol, one of 128, 256, 512, 1024, 1536, and 2048 can be selected and used as the number of subcarriers.

Figure 4:
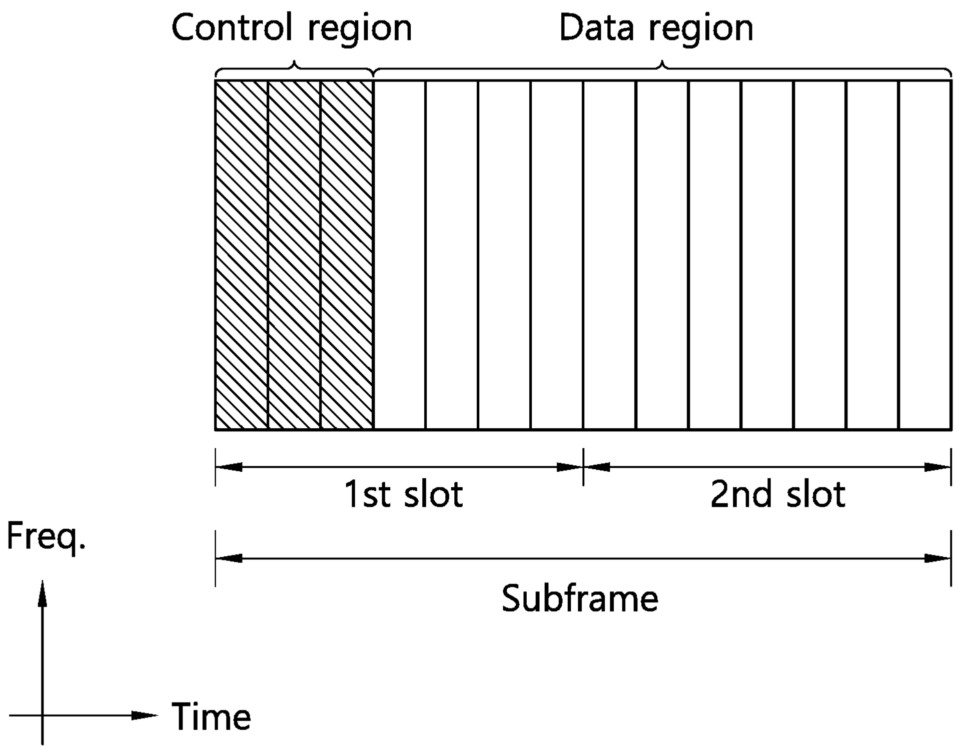
FIG. 4 shows the structure of a DL subframe.

FIG. 4 shows the structure of a DL subframe.

Referring to FIG. 4, a downlink (DL) subframe is divided into a control region and a data region in the time domain. The control region includes a maximum of former 3 (maximum 4 according to circumstances) OFDM symbols of a first slot within a subframe, but the number of OFDM symbols included in the control region can be changed. A control channel different from a physical downlink control channel (PDCCH) is allocated to the control region, and a physical downlink shared channel (PDSCH) is allocated to the data region.

As disclosed in 3GPP TS 36.211 V8.7.0, in 3GPP LTE, physical channels can be divided into a physical downlink shared channel (PDSCH) and a physical uplink shared channel (PUSCH), that is, data channels, and a physical downlink control channel (PDCCH), a physical control format indicator channel (PCFICH), a physical hybrid-ARQ indicator channel (PHICH), and a physical uplink control channel (PUCCH), that is, control channels.

A PCFICH that is transmitted in the first OFDM symbol of a subframe carries a Control Format Indicator (CFI) regarding the number of OFDM symbols (i.e., the size of a control region) that are used to send control channels within the subframe. UE first receives a CFI on a PCFICH and then monitors PDCCHs. Unlike in a PDCCH, a PCFICH is not subject to blind decoding, but is transmitted through the fixed PCFICH resources of a subframe.

A PHICH carries a positive-acknowledgement (ACK)/negative-acknowledgement (NACK) signal for an uplink Hybrid Automatic Repeat reQuest (HARQ). An ACK/NACK signal for uplink (UL) data on a PUSCH which is transmitted by UE is transmitted on a PHICH.

A physical broadcast channel (PBCH) is transmitted in the former 4 OFDM symbols of a second slot within the first subframe of a radio frame. The PBCH carries system information that is essential for UE to communicate with a BS, and system information transmitted through a PBCH is called a Master Information Block (MIB). In contrast, system information transmitted on a PDSCH indicated by a PDCCH is called a System Information Block (SIB).

Control information transmitted through a PDCCH is called Downlink Control Information (DCI). DCI can include the resource allocation of a PDSCH (this is also called a DL grant), the resource allocation of a PUSCH (this is also called an UL grant), a set of transmit power control commands for individual MSs within a specific UE group and/or the activation of a Voice over Internet Protocol (VoIP). DCI has different formats, which will be described later.

A channel region in a subframe includes a plurality of control channel elements (CCEs). A CCE is a logical allocation unit used to provide a coding rate according to the state of a radio channel to a PDCCH and corresponds to a plurality of resource element groups (REGs). An REG includes a plurality of REs. A PDCCH format and the number of available PDCCH bits are determined based on a relationship between the number of CCEs and a coding rate provided by CCEs.

One REG includes four REs, and one CCE includes nine REGs. To construct one PDCCH, {1, 2, 4, 8} CCEs may be used, and each element of {1, 2, 4, 8} is defined as a CCE aggregation level.

The number of CCEs used to transmit a PDDCH is determined by a base station based on a channel state.

Figure 5:
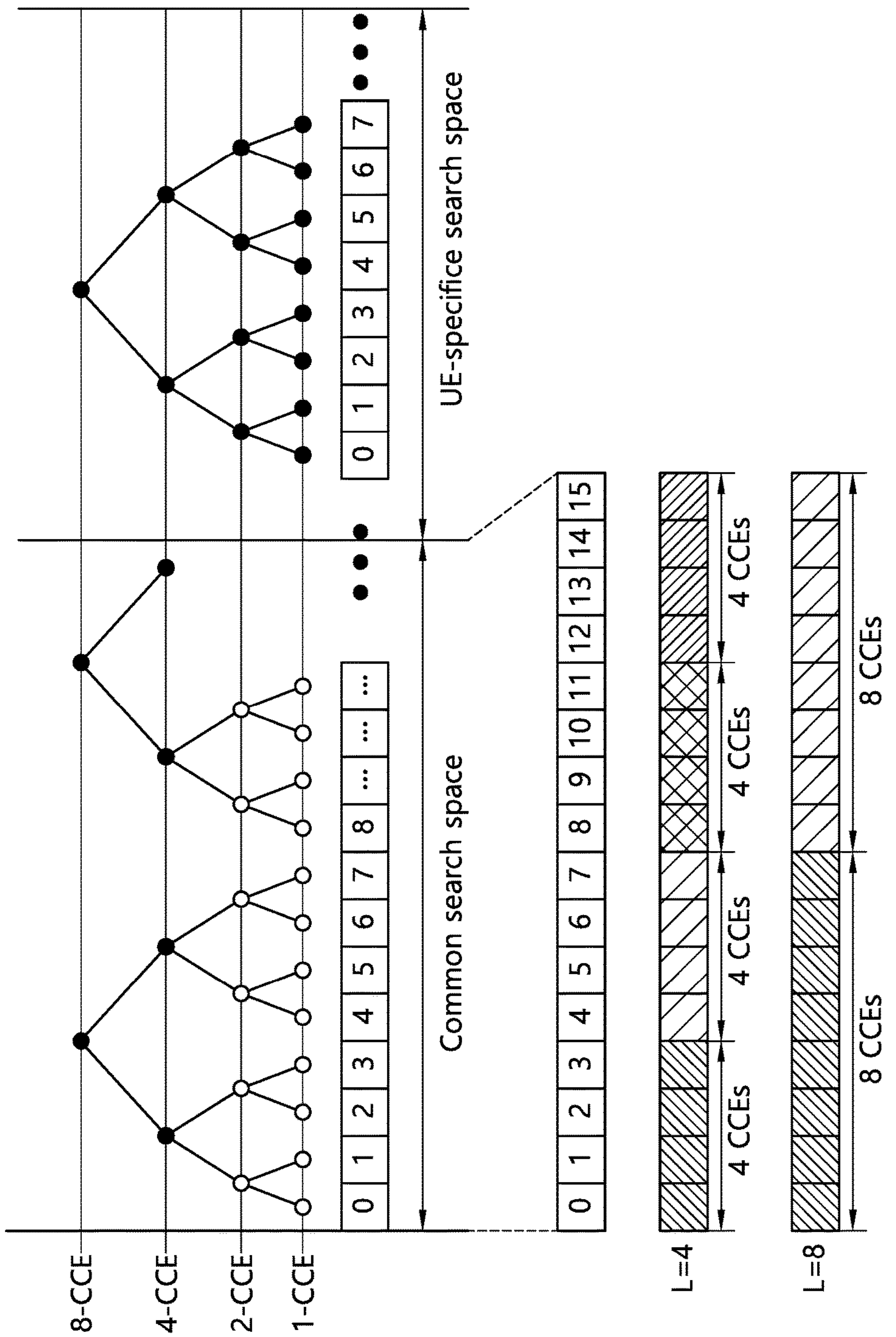
FIG. 5 illustrates an example of PDCCH monitoring.

FIG. 5 illustrates an example of PDCCH monitoring.

In 3GPP LTE, blind decoding is used to detect a PDCCH. Blind decoding is a process of de-masking a cyclic redundancy check (CRC) of a received PDCCH (PDCCH candidate) with a desired identifier to check a CRC error, thereby allowing a UE to identify whether the PDCCH is a control channel of the UE. The UE does not recognize a position in which a PDCCH thereof is transmitted in a control region and a CCE aggregation level or DCI format used to transmit the PDCCH.

A plurality of PDCCHs may be transmitted in one subframe. The UE monitors a plurality of PDCCHs in each subframe. Here, monitoring refers to an attempt of the UE to decode a PDCCH according to a monitored PDCCH format.

In 3GPP LET, a search space is used to reduce load caused by blind decoding. A search space may denote a monitoring set of CCEs for a PDCCH. A UE monitors a PDCCH in a corresponding search space.

A search space is divided into a common search space (CSS) and a UE-specific search space (USS). A CSS is a space for searching for a PDCCH having common control information, which includes 16 CCEs with CCE indexes of 0 to 15 and supports a PDCCH having a CCE aggregation level of {4, 8}. However, a PDCCH (DCI format 0 and 1A) carrying UE-specific information may also be transmitted to the CSS. The USS supports a PDCCH having a CEE aggregation level of {1, 2, 4, 8}.

A different start point of a search space is defined for a CSS and a USS. A start point of a CSS is fixed regardless of subframes, while a start point of a USS may change by subframe according to an UE ID (for example, C-RNTI), a CCE aggregation level and/or a slot number in a radio frame. When the start point of the USS is in the CSS, the USS and the CSS may overlap.

Hereinafter, conventional DCI formats transmitted on a PDCCH will be described.

Figure 6:
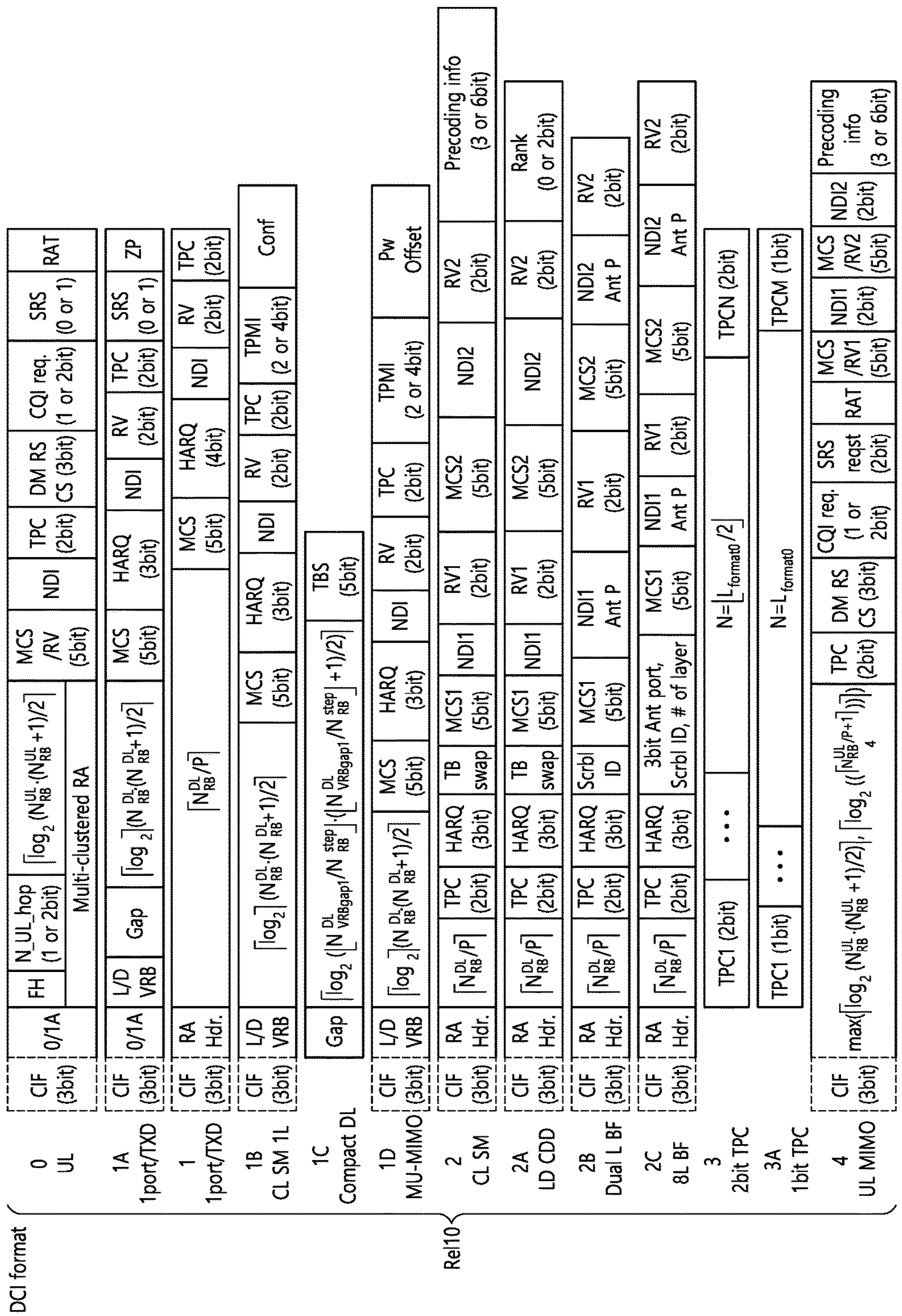
FIG. 6 illustrates structures of DCI formats used in FDD.
Figure 7:
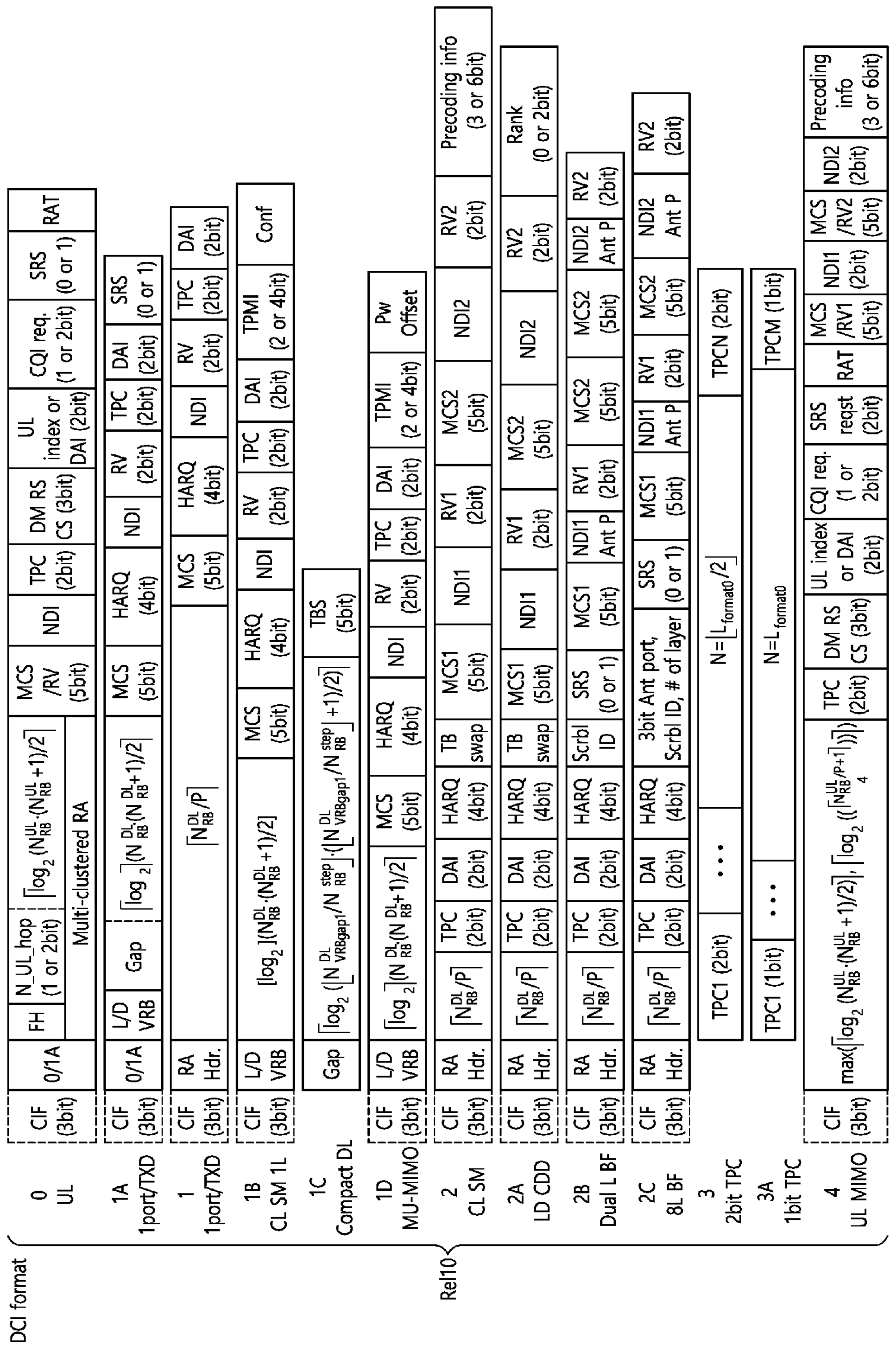
FIG. 7 illustrates structures of DCI formats used in TDD.

FIG. 6 illustrates structures of DCI formats used in FDD, and FIG. 7 illustrates structures of DCI formats used in TDD. In FIGS. 6 and 7, DCI format #A is represented simply by #A.

Referring to FIGS. 6 and 7, the DCI formats include fields to be described below, and the respective fields may be mapped to information bits $a_0$ to $a_{A-1}$. The respective fields may be mapped in order described in each DCI format and include padding bits 0. A first field may be mapped to a lowest-order information bit $a_0$, and other consecutive fields may be mapped to high-order information bits. A most significant bit (MSB) in each field may be mapped to a lowest-order information bit in the field. For example, an MSB in the first field may be mapped to $a_0$. Hereinafter, a set of fields included in each conventional DCI format is referred to as an information field.

1. DCI Format 0

DCI format 0 is used for PUSCH scheduling in one uplink cell. The following information (fields) is transmitted through DCI format 0:

1) Carrier indicator field (CIF, same hereinafter), which may have a length of 0 or 3 bits; 2) Flag for DCI format 0 and DCI format 1A differentiation (0 indicates DCI format 0 and 1 indicates DCI format 1A); 3) Frequency hopping flag (1 bit); 4) Resource block assignment and hopping resource allocation; 5) Modulation and coding scheme and redundancy version (5 bits); 6) New data indicator (1 bit); 7) TPC command for scheduled PUSCH (2 bits); 8) Cyclic shift for DM-RS and orthogonal cover code (OCC) index (3 bits); 9) UL index (2 bits); 10) Downlink assignment index (DAI, only for TDD); 11) CSI request; 12) Sounding reference signal (SRS) request (present only in DCI formats scheduling a PUSCH, mapped to a USS); and 13) Resource allocation type (present only when the number of RBs allocated to a downlink is the number of RBs allocated to an uplink or greater). If the number of information bits in DCI format 0 is smaller than payload size of DCI format 1A, DCI format 0 is padded with 0 to be equal to the payload size of DCI format 1A.

2. DCI Format 1

DCI format 1 is used for scheduling one PDSCH codeword in one cell. The following information is transmitted through DCI format 1:

1) CIF (0 or 3 bits); 2) Resource allocation header (indicating resource allocation type 0/type 1)—not included on the assumption of resource allocation type 0 when a downlink bandwidth is smaller than 10 PRB, the resource allocation header is not included; 3) Resource block assignment; 4) Modulation and coding scheme (5 bits); 5) HARQ process number (3 bits for FDD and 4 bits for TDD); 6) New data indicator (1 bit); 7) Redundancy version (2 bits); 8) TPC command for PUCCH (2 bits); 9) DAI (2 bits, only for TDD); and 10) HARQ-ACK resource offset (2 bits). If the number of information bits in DCI format 1 is equal to that in DCI format 0/1A, one bit having a value of 0 is added to DCI format 1. If the number of information bits in DCI format 1 is one of {12, 14, 16, 20, 24, 26, 32, 40, 44, 56}, one or more bits having a value of 0 are added to DCI format 1 so that DCI format 1 has a different payload size from {12, 14, 16, 20, 24, 26, 32, 40, 44, 56} and payload sizes of DCI format 0/1A.

3. DCI Format 1A

DCI format 1A is used for compact scheduling of one PDSCH in one cell codeword or a random access process induced by a PDCCH command. DCI corresponding to a PDCCH command may be transmitted through a PDCCH or enhanced PDCCH (EPDCCH).

The following information is transmitted through DCI format 1A: 1) CIF (0 or 3 bits); 2) Flag for DCI format 0 and DCI format 1A differentiation (1 bit); 3) Localized/distributed virtual resource block (VRB) assignment flag (1 bit); 4) Resource block assignment; 5) Preamble index (6 bits); 6) Physical random access channel (PRACH) mask index (4 bits); 7) Modulation and coding scheme (5 bits); 8) HARQ process number (3 bits); 9) New data indicator (1 bit); 10) Redundancy version (2 bits); 11) TPC command for PUCCH (2 bits); 12) DAI (2 bits, only for TDD); 13) SRS request (0 or 1 bit); and 14) HARQ-ACK resource offset (2 bits). If the number of information bits in DCI format 1A is smaller than the number of information bits in DCI format 0, bits having a value of 0 are added so that DCI format 1A has the same payload size as DCI format 0. If the number of information bits in DCI format 1A is one of {12, 14, 16, 20, 24, 26, 32, 40, 44, 56}, one bit having a value of 0 is added to DCI format 1A.

4. DCI Format 1B

DCI format 1B includes precoding information and is used for simple scheduling of one PDSCH codeword in one cell. The following information is transmitted through DCI format 1B:

1) CIF (0 or 3 bits); 2) Localized/distributed (VRB) assignment flag (1 bit); 3) Resource block assignment; 4) Modulation and coding scheme (5 bits); 5) HARQ process number (3 bits); 6) New data indicator (1 bit); 7) Redundancy version (2 bits); 8) TPC command for PUCCH (2 bits); 9) DAI (2 bits, only for TDD); 10) Transmitted precoding matrix indicator (TPMI) information for precoding; and 11) PMI confirmation for precoding (1 bit). If the number of information bits in DCI format 1B is equal to one of {12, 14, 16, 20, 24, 26, 32, 40, 44, 56}, one bit having a value of 0 is added to DCI format 1B.

5. DCI Format 1C

DCI format 1C is used for very compact scheduling of one PDSCH codeword and multicast control channel (MCCH) change notification. In the very compact scheduling, the following information is transmitted through DCI format 1C: 1) Gap value indicator (1 bit); 2) Resource block assignment; and 3) Modulation and coding scheme. In the MCCH change notification, the following information is transmitted through DCI format 1C: 1) MCCH change notification information (8 bits); and 2) Reserved information bits.

6. DCI Format 1D

DCI format 1D includes precoding and power offset information and is used for simple scheduling of one PDSCH codeword in one cell.

The following information is transmitted through DCI format 1D:

1) CIF (0 or 3 bits); 2) Localized/distributed (VRB) assignment flag (1 bit); 3) Resource block assignment; 4) Modulation and coding scheme (5 bits); 5) HARQ process number (3 bits for FDD and 4 bits for TDD); 6) New data indicator (1 bit); 7) Redundancy version (2 bits); 8) TPC command for PUCCH (2 bits); 9) DAI (2 bits, only for TDD); 10) TPMI information for precoding; 11) Downlink power offset (1 bit); and 12) HARQ-ACK resource offset (2 bits). If the number of information bits in DCI format 1D is equal to one of {12, 14, 16, 20, 24, 26, 32, 40, 44, 56}, one bit having a value of 0 is added to DCI format 1D.

7. DCI Format 2

DCI format 2 is used for assignment of a PDSCH for a closed-loop MIMO operation. The following information is transmitted through DCI format 2:

1) CIF (0 or 3 bits); 2) Resource allocation header (1 bit); 3) Resource block assignment; 4) TPC command for PUCCH (2 bits); 5) DAI (2 bits, only for TDD); 6) HARQ process number (3 bits for FDD and 4 bits for TDD); 7) Transport block to codeword swap flag (1 bit); 8) Modulation and coding scheme (5 bits); 9) New data indicator (1 bit); 10) Redundancy version (2 bits); 11) Precoding information; and 12) HARQ-ACK resource offset. 8) to 10) may be given to each transport block.

8. DCI Format 2A

DCI format 2A is used for assignment of a PDSCH for an open-loop MIMO operation. The following information is transmitted through DCI format 2A:

1) CIF (0 or 3 bits); 2) Resource allocation header (1 bit); 3) Resource block allocation; 4) TPC command for PUCCH (2 bits); 5) Downlink assignment flag (DAI, 2 bits, only for TDD); 6) HARQ process number (3 bits for FDD and 4 bits for TDD); 7) Transport block to codeword swap flag (1 bit); 8) Modulation and coding scheme (5 bits); 9) New data indicator (1 bit); 10) Redundancy version (2 bits); 11) Precoding information; and 12) HARQ-ACK resource offset.

9. DCI Format 2B

The following information is transmitted through DCI format 2B:

1) CIF (0 or 3 bits); 2) Resource allocation header (1 bit); 3) Resource block allocation; 4) TPC command for PUCCH (2 bits); 5) Downlink assignment flag (DAI, 2 bits, only for TDD); 6) HARQ process number (3 bits for FDD and 4 bits for TDD); 7) Scrambling identity (ID) (1 bit); 8) SRS request (0 or 1 bit); 9) Modulation and coding scheme (5 bits); 10) New data indicator (1 bit); 11) Redundancy version (2 bits); and 12) HARQ-ACK resource offset.

10. DCI Format 2C

The following information is transmitted through DCI format 2C:

1) CIF (0 or 3 bits); 2) Resource allocation header (1 bit); 3) Resource block allocation; 4) TPC command for PUCCH (2 bits); 5) Downlink assignment flag (DAI, 2 bits, only for TDD); 6) HARQ process number (3 bits for FDD and 4 bits for TDD); 7) Antenna port, scrambling ID and number of layers (3 bits); 8) SRS request (0 or 1 bit); 9) Modulation and coding scheme (5 bits); 10) New data indicator (1 bit); 11) Redundancy version (2 bits); and 12) HARQ-ACK resource offset.

11. DCI Format 2D

The following information is transmitted through DCI format 2D:

1) CIF (0 or 3 bits); 2) Resource allocation header (1 bit); 3) Resource block allocation; 4) TPC command for PUCCH (2 bits); 5) Downlink assignment flag (DAI, 2 bits, only for TDD); 6) HARQ process number (3 bits for FDD and 4 bits for TDD); 7) Antenna port, scrambling ID and number of layers (3 bits); 8) SRS request (0 or 1 bit); 9) Modulation and coding scheme (5 bits); 10) New data indicator (1 bit); 11) Redundancy version (2 bits); 12) PDSCH resource element mapping and quasi-co-location indicator; and 13) HARQ-ACK resource offset.

12. DCI Format 3

DCI format 3 is used to transmit TPC commands for a PUCCH and PUSCH with 2-bit power adjustment. N TCP commands may be transmitted through DCI format 3.

13. 12. DCI Format 3A

DCI format 3A is used to transmit TPC commands for a PUCCH and PUSCH with 1-bit power adjustment. M TCP commands may be transmitted through DCI format 3A.

14. 12. DCI Format 4

DCI format 4 is used for scheduling of a PUSCH in one uplink cell having a multi-antenna port transmission mode.

1) CIF (0 or 3 bits); 2) Resource block allocation; 4) TPC command for PUSCH (2 bits); 4) Cyclic shift for DM-RS and OCC index (3 bits); 5) UL index (2 bits); 6) Downlink assignment flag (DAI, 2 bits, only for TDD); 7) CSI request (1 or 2 bits); 8) SRS request (2 bits); 9) Resource allocation type (1 bit); 10) Modulation and coding scheme and redundancy version (5 bits); 11) New data indicator (1 bit); and 12) Precoding information and number of layers.

Figure 8:
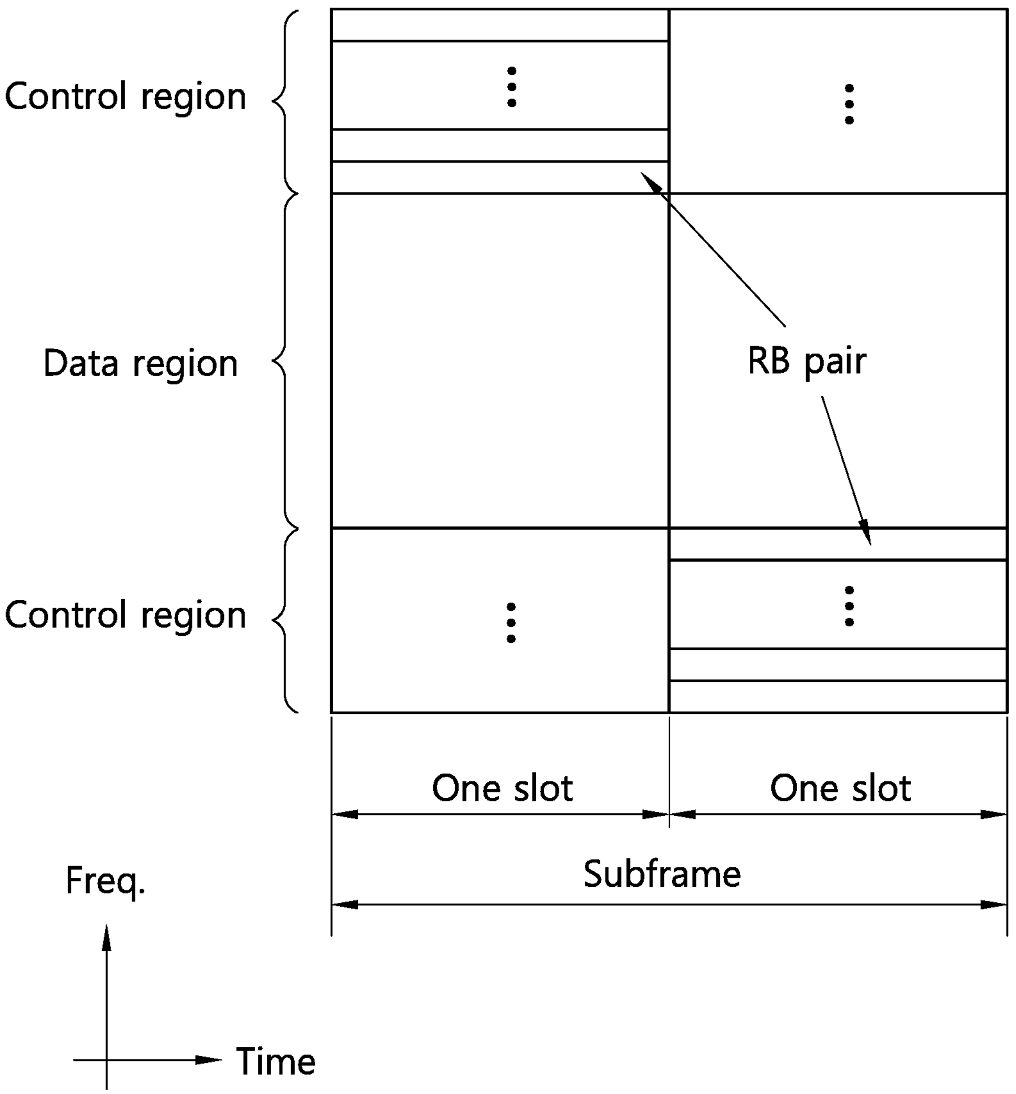
FIG. 8 shows the structure of an UL subframe.

FIG. 8 shows the structure of an UL subframe.

Referring to FIG. 8, the UL subframe can be divided into a control region to which a physical uplink control channel (PUCCH) for carrying uplink control information is allocated and a data region to which a physical uplink shared channel (PUSCH) for carrying user data is allocated in the frequency domain.

A PUCCH is allocated with an RB pair in a subframe. RBs that belong to an RB pair occupy different subcarriers in a first slot and a second slot. An RB pair has the same RB index m.

In accordance with 3GPP TS 36.211 V8.7.0, a PUCCH supports multiple formats. A PUCCH having a different number of bits in each subframe can be used according to a modulation scheme that is dependent on a PUCCH format.

Table 2 below shows an example of modulation schemes and the number of bits per subframe according to PUCCH formats.

TABLE 2

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used to send a Scheduling Request (SR), the PUCCH formats 1a/1b are used to send an ACK/NACK signal for an HARQ, the PUCCH format 2 is used to send a CQI, and the PUCCH formats 2a/2b are used to send a CQI and an ACK/NACK signal at the same time. When only an ACK/NACK signal is transmitted in a subframe, the PUCCH formats 1a/1b are used. When only an SR is transmitted, the PUCCH format 1 is used. When an SR and an ACK/NACK signal are transmitted at the same time, the PUCCH format 1 is used. In this case, the ACK/NACK signal is modulated into resources allocated to the SR and is then transmitted.

All the PUCCH formats use the Cyclic Shift (CS) of a sequence in each OFDM symbol. A CS sequence is generated by cyclically shifting a base sequence by a specific CS amount. The specific CS amount is indicated by a CS index.

An example in which a base sequence $r_u(n)$ has been defined is the same as the following equation.

$$r_u(n)=e^{jb(n)\pi/4} \quad \text{[Equation 1]}$$

Here, u is a root index, n is an element index wherein $0 \le n \le N-1$, and N is the length of the base sequence. b(n) is defined in section 5.5 of 3GPP TS 36.211 V8.7.0.

The length of a sequence is the same as the number of elements included in the sequence. U can be determined by a cell identifier (ID), a slot number within a radio frame, etc.

Assuming that a base sequence is mapped to one resource block in the frequency domain, the length N of the base sequence becomes 12 because one resource block includes 12 subcarriers. A different base sequence is defined depending on a different root index.

A CS sequence $r(n, I_{cs})$ can be generated by cyclically shifting the base sequence r(n) as in Equation 2.

$$r(n, I_{cs}) = r(n)\cdot\exp\left(\frac{j2\pi I_{cs}n}{N}\right), \quad 0 \le I_{cs} \le N-1 \quad \text{[Equation 2]}$$

Here, $I_{cs}$ is a CS index indicative of a CS amount ($0 \le I_{cs} \le N-1$).

An available CS index of a base sequence refers to a CS index that can be derived from the base sequence according to a CS interval. For example, the length of a base sequence is 12 and a CS interval is 1, a total number of available CS indices of the base sequence becomes 12. Or, if the length of a base sequence is 12 and a CS interval is 2, a total number of available CS indices of the base sequence becomes 6.

Figure 9:
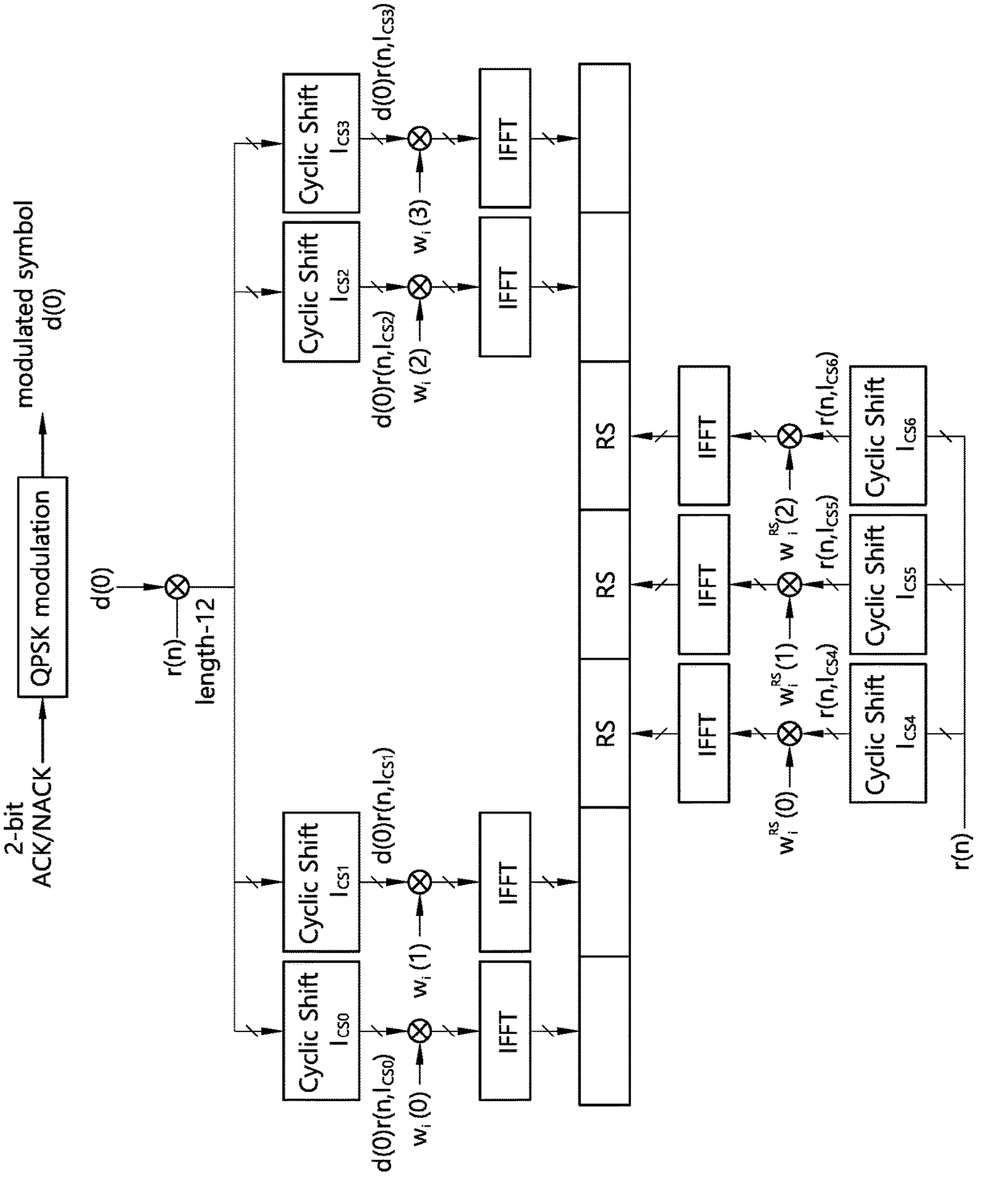
FIG. 9 shows the channel structure of a PUCCH format 1b in a normal CP.

FIG. 9 shows the channel structure of the PUCCH format 1b in a normal CP.

One slot includes 7 OFDM symbols, the 3 OFDM symbols become Reference Signal (RS) OFDM symbols for a reference signal, and the 4 OFDM symbols become data OFDM symbols for an ACK/NACK signal.

In the PUCCH format 1b, a modulation symbol d(0) is generated by performing Quadrature Phase Shift Keying (QPSK) modulation on an encoded 2-bit ACK/NACK signal.

A CS index $I_{cs}$ can vary depending on a slot number 'ns' within a radio frame and/or a symbol index '1' within a slot.

In a normal CP, 4 data OFDM symbols for sending an ACK/NACK signal are present in one slot. It is assumed that corresponding CS indices in respective data OFDM symbols are $I_{cs0}$, $I_{cs1}$, $I_{cs2}$, and $I_{cs3}$.

The modulation symbol d(0) is spread into a CS sequence r(n,Ics). Assuming that a 1-dimensional spread sequence corresponding to an $(i+1)^{th}$ OFDM symbol is m(i) in a slot, $\{m(0), m(1), m(2), m(3)\}=\{d(0)r(n,I_{cs0}), d(0)r(n,I_{cs1}), d(0)r(n,I_{cs2}), d(0)r(n,I_{cs3})\}$ can be obtained.

In order to increase a UE capacity, the 1-dimensional spread sequence can be spread using an orthogonal sequence. The following sequence is used as an orthogonal sequence $w_i(k)$ (i is a sequence index, $0 \le k \le K-1$) wherein a spreading factor K=4.

TABLE 3

| Index (i) | $[w_i(0), w_i(1), w_i(2), w_i(3)]$ |
|---|---|
| 0 | [+1, +1, +1, +1] |
| 1 | [+1, −1, +1, −1] |
| 2 | [+1, −1, −1, +1] |

The following sequence is used as an orthogonal sequence $w_i(k)$ (i is a sequence index, $0 \le k \le K-1$) wherein a spreading factor K=3.

TABLE 4

| Index (i) | $[w_i(0), w_i(1), w_i(2)]$ |
|---|---|
| 0 | [+1, +1, +1] |
| 1 | $[+1, e^{j2\pi/3}, e^{j4\pi/3}]$ |
| 2 | $[+1, e^{j4\pi/3}, e^{j2\pi/3}]$ |

A different spreading factor can be used in each slot.

Accordingly, assuming that a specific orthogonal sequence index i is given, 2-dimensional spread sequences {s(0), s(1), s(2), s(3)} can be expressed as follows.

$$\{s(0),s(1),s(2),s(3)\}=\{w_i(0)m(0),w_i(1)m(1),w_i(2)m(2),\ w_i(3)na(3)\}$$

The 2-dimensional spread sequences {s(0), s(1), s(2), s(3)} are subject to IFFT and then transmitted in a corresponding OFDM symbol. Accordingly, an ACK/NACK signal is transmitted on a PUCCH.

A reference signal having the PUCCH format 1b is also transmitted by spreading the reference signal into an orthogonal sequence after cyclically shifting a base sequence r(n). Assuming that CS indices corresponding to 3 RS OFDM symbols are $I_{cs4}$, $I_{cs5}$, and $I_{cs6}$, 3 CS sequences $r(n,I_{cs4})$, $r(n,I_{cs5})$, $r(n,I_{cs6})$ can be obtained. The 3 CS sequences are spread into an orthogonal sequence $w^{RS}_i(k)$ wherein K=3.

An orthogonal sequence index i, a CS index $I_{cs}$, and an RB index m are parameters necessary to configure a PUCCH and are also resources used to classify PUCCHs (or MSs). If the number of available CSs is 12 and the number of available orthogonal sequence indices is 3, a PUCCH for a total of 36 MSs can be multiplexed with one RB.

In 3GPP LTE, a resource index $n^{(1)}_{PUCCH}$ is defined so that UE can obtain the three parameters for configuring a PUCCH. The resource index $n^{(1)}_{PUCCH}=n_{CCE}+N^{(1)}_{PUCCH}$, wherein $n_{CCE}$ is the number of the first CCE used to send a corresponding PDCCH (i.e., PDCCH including the allocation of DL resources used to received downlink data corresponding to an ACK/NACK signal), and $N^{(1)}_{PUCCH}$ is a parameter that is informed of UE by a BS through a higher layer message.

Time, frequency, and code resources used to send an ACK/NACK signal are called ACK/NACK resources or PUCCH resources. As described above, an index of ACK/NACK resources (called an ACK/NACK resource index or PUCCH index) used to send an ACK/NACK signal on a PUCCH can be represented as at least one of an orthogonal sequence index i, a CS index $I_{cs}$, an RB index m, and an index for calculating the 3 indices. ACK/NACK resources can include at least one of an orthogonal sequence, a CS, a resource block, and a combination of them.

Figure 10:
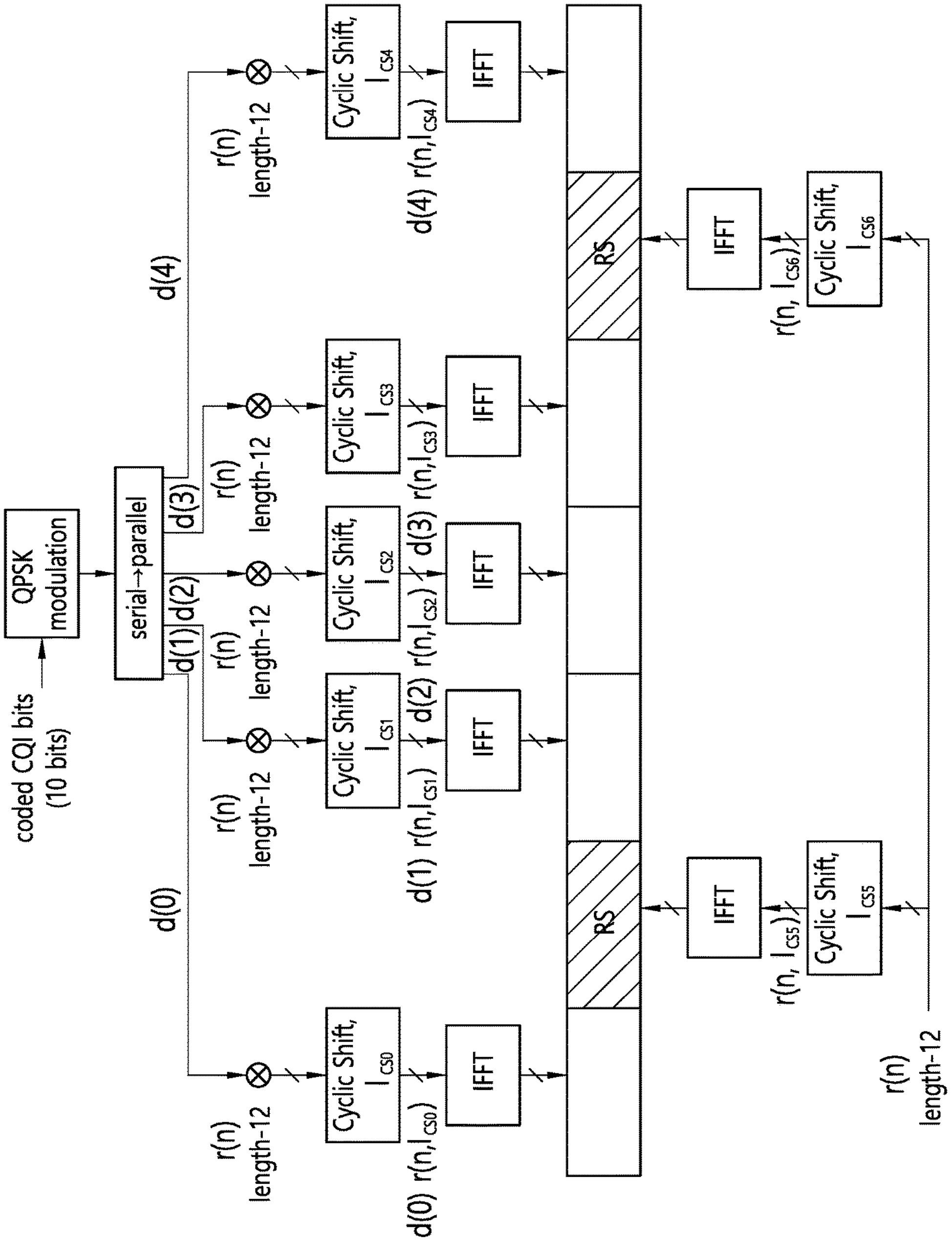
FIG. 10 shows the channel structure of PUCCH formats 2/2a/2b in a normal CP.

FIG. 10 shows the channel structure of the PUCCH formats 2/2a/2b in a normal CP.

Referring to FIG. 10, in a normal CP, OFDM symbols 1 and 5 (i.e., second and sixth OFDM symbols) are used to send a demodulation reference signal (DM RS), that is, an uplink reference signal, and the remaining OFDM symbols are used to send a CQI. In the case of an extended CP, an OFDM symbol 3 (fourth symbol) is used for a DM RS.

10 CQI information bits can be subject to channel coding at a ½ code rate, for example, thus becoming 20 coded bits. Reed-Muller code can be used in the channel coding. Next, the 20 coded bits are scramble and then subject to QPSK constellation mapping, thereby generating a QPSK modulation symbol (d(0) to d(4) in a slot 0). Each QPSK modulation symbol is modulated in a cyclic shift of a base RS sequence 'r(n)' having a length of 12, subject to IFFT, and then transmitted in each of 10 SC-FDMA symbols within a subframe. Uniformly spaced 12 CSs enable 12 different MSs to be orthogonally multiplexed in the same PUCCH RB. A base RS sequence 'r(n)' having a length of 12 can be used as a DM RS sequence applied to OFDM symbols 1 and 5.

Figure 11:
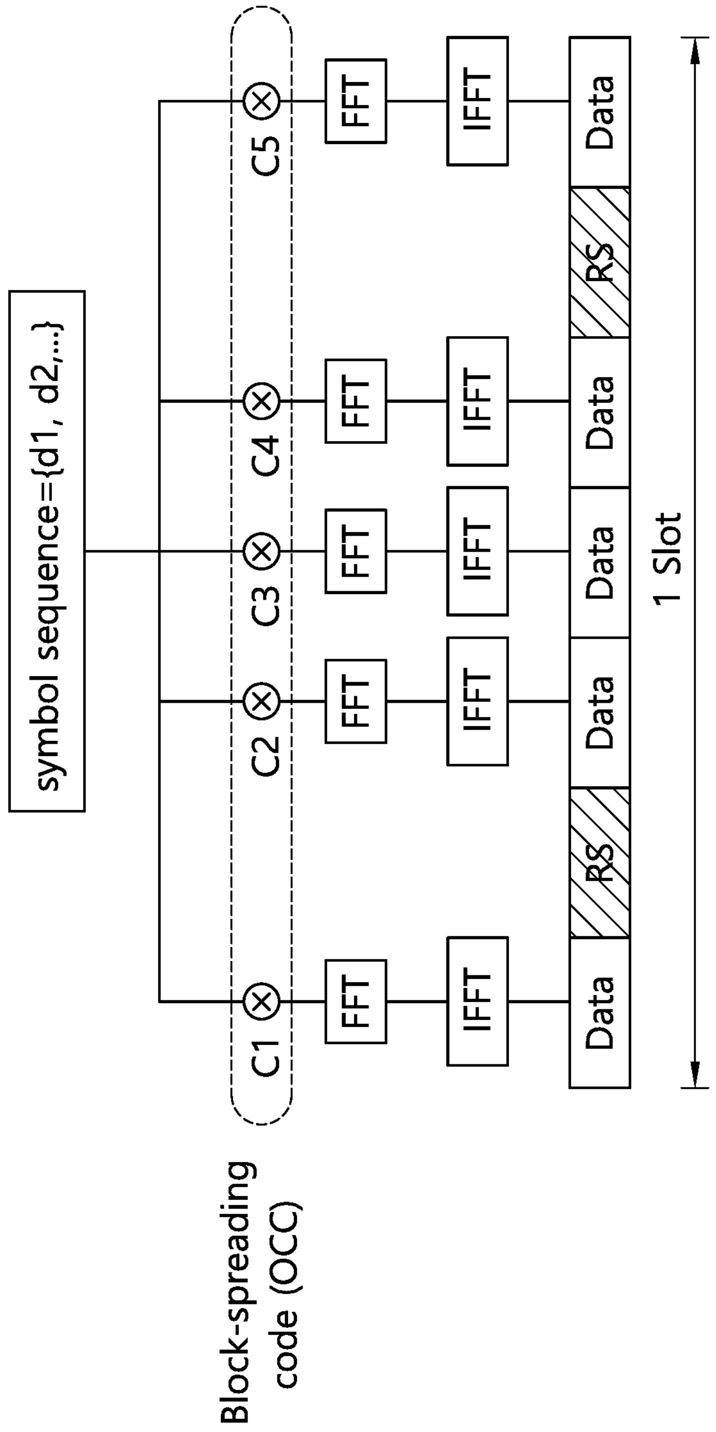
FIG. 11 illustrates the channel structure of a PUCCH format 3.

FIG. 11 shows an example of a channel structure of a PUCCH format 3.

Referring to FIG. 11, the PUCCH format 3 is a PUCCH format which uses a block spreading scheme. The block spreading scheme means a method of spreading a symbol sequence, which is obtained by modulating a multi-bit ACK/NACK, in a time domain by using a block spreading code.

In the PUCCH format 3, a symbol sequence (e.g., ACK/NACK symbol sequence) is transmitted by being spread in the time domain by using the block spreading code. An orthogonal cover code (OCC) may be used as the block spreading code. Control signals of several UEs may be multiplexed by the block spreading code. In the PUCCH format 2, a symbol (e.g., d(0), d(1), d(2), d(3), d(4), etc., of FIG. 7) transmitted in each data symbol is different, and UE multiplexing is performed using the cyclic shift of a constant amplitude zero auto-correlation (CAZAC) sequence. In contrast, in the PUCCH format 3, a symbol sequence including one or more symbols is transmitted in a frequency domain of each data symbol, the symbol sequence is spread in a time domain by using the block spreading code, and UE multiplexing is performed. An example in which 2 RS symbols are used in one slot has been illustrated in FIG. 11, but the present invention is not limited thereto. 3 RS symbols may be used, and an OCC having a spreading factor value of 4 may be used. An RS symbol may be generated from a CAZAC sequence having a specific cyclic shift and may be transmitted in such a manner that a plurality of RS symbols in the time domain has been multiplied by a specific OCC.

Now, a carrier aggregation system is described. The carrier aggregation system is also called a multiple carrier system.

A 3GPP LTE system supports a case where a DL bandwidth and a UL bandwidth are differently configured, but one component carrier (CC) is a precondition in this case. A 3GPP LTE system supports a maximum of 20 MHz and may be different in a UL bandwidth and a DL bandwidth, but supports only one CC in each of UL and DL A carrier aggregation (also called a bandwidth aggregation or a spectrum aggregation) supports a plurality of CCs. For example, if 5 CCs are allocated as the granularity of a carrier unit having a 20 MHz bandwidth, a maximum of a 100 MHz bandwidth may be supported.

Figure 12:
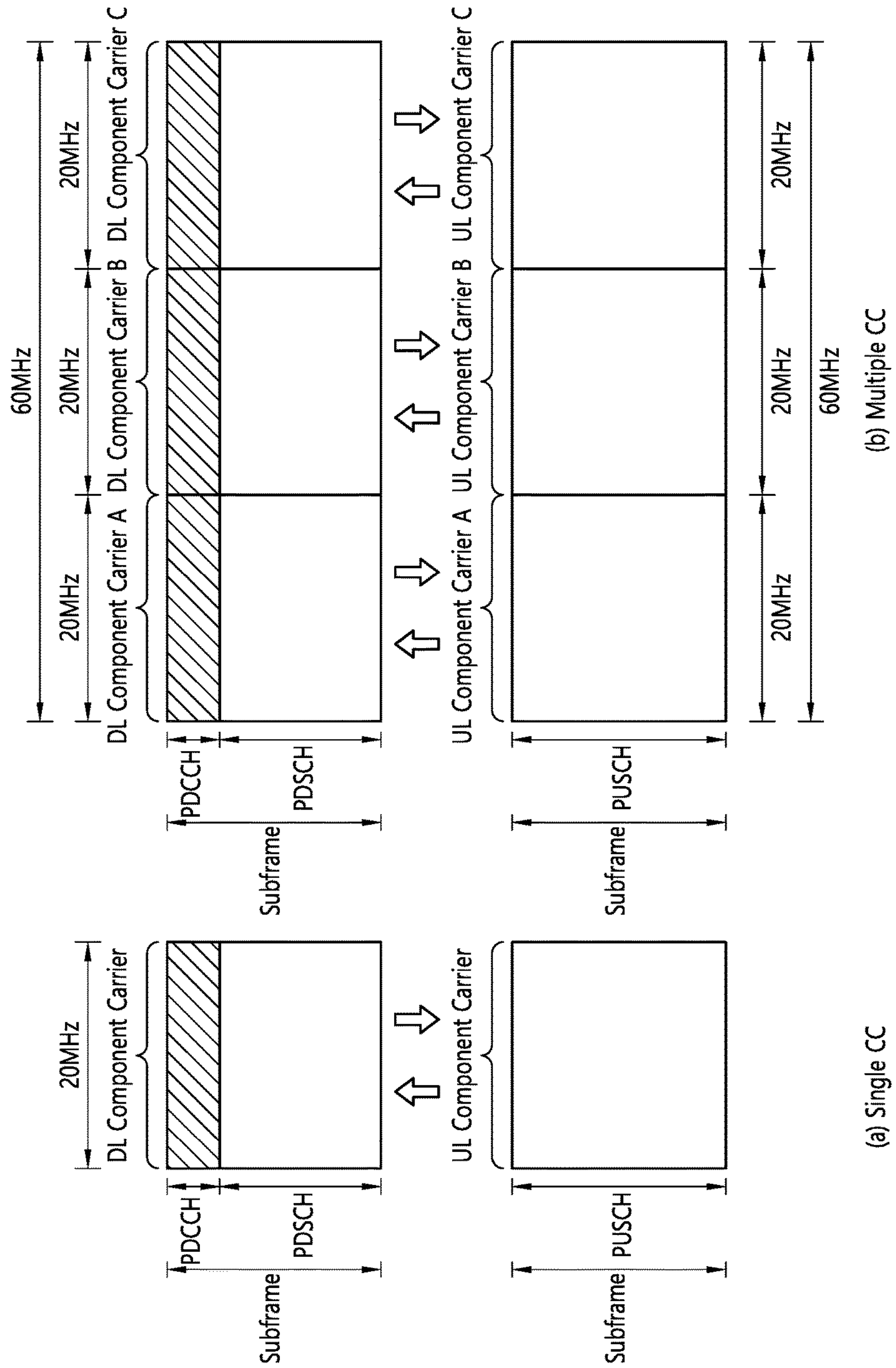
FIG. 12 shows an example of a comparison between a single carrier system and a carrier aggregation system.

FIG. 12 shows an example of a comparison between a single carrier system and a carrier aggregation system.

A carrier aggregation system (FIG. 12 (*b*)) has been illustrated as including three DL CCs and three UL CCs, but the number of DL CCs and UL CCs is not limited. A PDCCH and a PDSCH may be independently transmitted in each DL CC, and a PUCCH and a PUSCH may be independently transmitted in each UL CC. Or, a PUCCH may be transmitted only through a specific UL CC.

Since three pairs of DL CCs and UL CCs are defined, it can be said that a UE is served from three serving cells. Hereinafter, a cell which is configured to provide a service to a user equipment is referred to a serving cell.

The UE may monitor PDCCHs in a plurality of DL CCs and receive DL transport blocks through the plurality of DL CCs at the same time. The UE may send a plurality of UL transport blocks through a plurality of UL CCs at the same time.

A pair of a DL CC #A and a UL CC #A may become a first serving cell, a pair of a DL CC #B and a UL CC #B may become a second serving cell, and a DL CC #C and a UL CC#C may become a third serving cell. Each serving cell may be identified by a cell index (CI). The CI may be unique within a cell or may be UE-specific.

The serving cell may be divided into a primary cell and a secondary cell. The primary cell is a cell on which the UE performs an initial connection establishment procedure or initiates a connection re-establishment procedure, or a cell designated as a primary cell in a handover process. The primary cell is also called a reference cell. The secondary cell may be configured after an RRC connection has been established and may be used to provide additional radio resources. At least one primary cell is always configured, and a secondary cell may be added/modified/released in response to higher layer signaling (e.g., an RRC message). The CI of the primary cell may be fixed. For example, the lowest CI may be designated as the CI of the primary cell.

The primary cell includes a downlink primary component carrier (DL PCC) and an uplink PCC (UL PCC) in view of a CC. The secondary cell includes only a downlink secondary component carrier (DL SCC) or a pair of a DL SCC and a UL SCC in view of a CC. Hereinafter, the term, 'cell' may be mixed with the term 'component carrier (CC)'.

As described above, the carrier aggregation system may support a plurality of CCs, that is, a plurality of serving cells unlike the single carrier system.

Such a carrier aggregation system may support cross-carrier scheduling. The cross-carrier scheduling is a scheduling method capable of performing resource allocation of a PDSCH transmitted through a different component carrier through a PDCCH transmitted through a specific component carrier and/or resource allocation of a PUSCH transmitted through other component carriers except for a component carrier fundamentally linked with the specific component carrier. That is, the PDCCH and the PDSCH may be transmitted through different DL CCs, and a PUSCH may be transmitted through a UL CC different from a UL CC linked with a DL CC to which a PDCCH including a UL is transmitted. As described above, in a system for supporting the cross-carrier scheduling, the PDCCH needs a carrier indicator indicating that PDSCH/PUSCH are transmitted through a certain DL CC/UL CC. Hereinafter, a field including the carrier indicator refers to a carrier indication field (CIF).

The carrier aggregation system that supports the cross-carrier scheduling may include a carrier indication field (CIF) to the conventional downlink control information (DCI). In a system that supports the cross-carrier scheduling, for example, LTE-A system, 3 bits may be extended since the CIF is added to the conventional DCI format (i.e., the DCI format used in LTE), and the PDCCH structure may reuse the conventional coding method, resource allocation method (i.e., resource mapping based on the CCE), and the like.

A BS may set a PDCCH monitoring DL CC (monitoring CC) group. The PDCCH monitoring DL CC group is configured by a part of all aggregated DL CCs. If the cross-carrier scheduling is configured, the UE performs PDCCH monitoring/decoding for only a DL CC included in the PDCCH monitoring DL CC group. That is, the BS transmits a PDCCH with respect to a PDSCH/PUSCH to be scheduled through only the DL CCs included in the PDCCH monitoring DL CC group. The PDCCH monitoring DL CC group may be configured in a UE-specific, UE group-specific, or cell-specific manner.

Non-cross carrier scheduling (NCSS) is a scheduling method capable of performing resource allocation of a PDSCH transmitted through a specific component carrier through a PDCCH transmitted through the specific component carrier and/or resource allocation of a PDSCH transmitted through a component carrier fundamentally linked with the specific component carrier.

ACK/NACK transmission for HARQ in 3GPP LTE Time Division Duplex (TDD) is described below.

In TDD, unlike in a Frequency Division Duplex (FDD), a DL subframe and an UL subframe coexist in one radio frame. In general, the number of UL subframes is smaller than that of DL subframes. Accordingly, in preparation for a case where UL subframes for sending an ACK/NACK signal are not sufficient, a plurality of ACK/NACK signals for DL transport blocks received in a plurality of DL subframes is transmitted in one UL subframe.

In accordance with section 10.1 of 3GPP TS 36.213 V8.7.0 (2009 May), two ACK/NACK modes: ACK/NACK bundling and ACK/NACK multiplexing are initiated.

In ACK/NACK bundling, UE sends ACK if it has successfully decoded all received PDSCHs (i.e., DL transport blocks) and sends NACK in other cases. To this end, ACK or NACKs for each PDSCH are compressed through logical AND operations.

ACK/NACK multiplexing is also called ACK/NACK channel selection (or simply channel selection). In accordance with ACK/NACK multiplexing, UE selects one of a plurality of PUCCH resources and sends ACK/NACK.

Table below shows DL subframes n-k associated with an UL subframe n according to an UL-DL configuration in 3GPP LTE, wherein $k \in K$ and M is the number of elements of a set K.

TABLE 5

| UL-DL | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

It is assumed that M DL subframes are associated with the UL subframe n and, for example, M=3. In this case, UE can obtain 3 PUCCH resources $n^{(1)}_{PUCCH,0}$, $n^{(1)}_{PUCCH,1}$, and $n^{(1)}_{PUCCH,2}$ because it can receive 3 PDCCHs from 3 DL subframes. In this case, an example of ACK/NACK channel selection is the same as the following table.

TABLE 6

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

In the above table, HARQ-ACK(i) indicates ACK/NACK for an $i^{th}$ DL subframe of M DL subframes. Discontinuous transmission (DTX) means that a DL transport block has not been received on a PDSCH in a corresponding DL subframe or that a corresponding PDCCH has not been detected. In accordance with Table 6, 3 PUCCH resources $n^{(1)}_{PUCCH,0}$, $n^{(1)}_{PUCCH,1}$, and $n^{(1)}_{PUCCH,2}$ are present, and b(0), b(1) are two bits transmitted using a selected PUCCH.

For example, when UE successfully receives all 3 DL transport blocks in 3 DL subframes, the UE performs QPSK modulation on bits (1,1) using $n^{(1)}_{PUCCH,2}$ and sends them on a PUCCH. If UE fails in decoding a DL transport block in a first (i=0) DL subframe, but succeeds in decoding the remaining transport blocks, the UE sends bits (1,0) on a PUCCH using $n^{(1)}_{PUCCH,2}$. That is, in the existing PUCCH format 1b, only ACK/NACK of 2 bits can be transmitted. However, in channel selection, allocated PUCCH resources are linked to an actual ACK/NACK signal in order to indicate more ACK/NACK states. This channel selection is also referred to as channel selection using the PUCCH format 1b.

In ACK/NACK channel selection, if at least one ACK is present, NACK and DTX are coupled. This is because all ACK/NACK states cannot be represented by a combination of reserved PUCCH resources and a QPSK symbol. If ACK is not present, however, DTX is decoupled from NACK.

The above-described ACK/NACK bundling and ACK/NACK multiplexing can be applied in the case where one serving cell has been configured in UE in TDD.

For example, it is assumed that one serving cell has been configured (i.e., only a primary cell is configured) in UE in TDD, ACK/NACK bundling or ACK/NACK multiplexing is used, and M=1. That is, it is assumed that one DL subframe is associated with one UL subframe.

1) UE sends ACK/NACK in a subframe n if the UE detects a PDSCH indicated by a corresponding PDCCH in a subframe n-k of a primary cell or detects a Semi-Persistent Scheduling (SPS) release PDCCH. In LTE, a BS can inform UE that semi-persistent transmission and reception are performed in what subframes through a higher layer signal, such as Radio Resource Control (RRC). Parameters given by the higher layer signal can be, for example, the periodicity of a subframe and an offset value. When the UE receives the activation or release signal of SPS transmission through a PDCCH after recognizing semi-persistent transmission through the RRC signaling, the UE performs or releases SPS PDSCH reception or SPS PUSCH transmission. That is, the UE does not immediately perform SPS transmission/reception although SPS scheduling is allocated thereto through the RRC signaling, but when an activation or release signal is received through a PDCCH, performs SPS transmission/reception in a subframe that corresponds to frequency resources (resource block) according to the allocation of the resource block designated by the PDCCH, modulation according to MCS information, a subframe periodicity allocated through the RRC signaling according to a code rate, and an offset value. Here, a PDCCH that releases SPS is called an SPS release PDCCH, and a DL SPS release PDCCH that releases DL SPS transmission requires the transmission of an ACK/NACK signal.

Here, in the subframe n, UE sends ACK/NACK using the PUCCH formats 1a/1b according to a PUCCH resource $n^{(1,p)}_{PUCCH}$. In $n^{(1,p)}_{PUCCH}$, p indicates an antenna port p. The k is determined by Table 5.

The PUCCH resource $n^{(1,p)}_{PUCCH}$ can be allocated as in the following equation. P can be p0 or p1.

$$n^{(1,p=p0)}_{PUCCH}=(M-m-1)\cdot N_c+m\cdot N_{c+1}+n_{CCE}+N^{(1)}_{PUCCH} \text{ for antenna port } p=p0,$$

$$n^{(1,p=p1)}_{PUCCH}(M-m-1)\cdot N_c+m\cdot N_{c+1}+(n_{CCE}+1)+N^{(1)}_{PUCCH} \text{ for antenna port } p=p1, \quad \text{[Equation 3]}$$

In Equation 3, c is selected in such a way as to satisfy $N_c \le n_{CCE} < N_{c+1}$ (antenna port p0) $N_c \le (n_{CCE}+1) < N_{c+1}$ (antenna port p1) from among {0, 1, 2, 3}. $n^{(1)}_{PUCCH}$ is a value set by a higher layer signal. $N_C=\max\{0, \text{floor } [N^{DL}_{RB}\cdot(N^{RB}_{sc}\cdot c-4)/36]\}$. The $N^{DL}_{RB}$ is a DL bandwidth, and $N^{RB}_{sc}$ is the size of an RB indicated by the number of subcarriers in the frequency domain. $n_{CCE}$ is a first CCE number used to send a corresponding PDCCH in a subframe $n-k_m$. m is a value that makes $k_m$ the smallest value in the set K of Table 5.

2) If UE detects an SPS PDSCH, that is, a PDSCH not including a corresponding PDCCH, in the DL subframe n−k of a primary cell, the UE can send ACK/NACK in the subframe n using the PUCCH resource $n^{(1,p)}_{PUCCH}$ as follows.

Since an SPS PDSCH does not include a scheduling PDCCH, UE sends ACK/NACK through the PUCCH formats 1a/1b according to $n^{(1,p)}_{PUCCH}$ that is configured by a higher layer signal. For example, 4 resources (a first PUCCH resource, a second PUCCH resource, a third PUCCH resource, and a fourth PUCCH resource) can be reserved through an RRC signal, and one resource can be indicated through the Transmission Power Control (TPC) field of a PDCCH that activates SPS scheduling.

The following table is an example in which resources for channel selection are indicated by a TPC field value.

TABLE 7

| TPC field value | Resource for channel selection |
|---|---|
| '00' | First PUCCH resource |
| '01' | Second PUCCH resource |
| '10' | Third PUCCH resource |
| '11' | Fourth PUCCH resource |

For another example, it is assumed that in TDD, one serving cell is configured (i.e., only a primary cell is configured) in UE, ACK/NACK multiplexing is used, and M>1. That is, it is assumed that a plurality of DL subframes is associated with one UL subframe.

1) A PUCCH resource $n^{(1)}_{PUCCH,i}$ for sending ACK/NACK when UE receives a PDSCH in a subframe (0≤i≤M-1) or detects a DL SPS release PDCCH can be allocated as in the following equation. Here, $k_i \in K$, and the set K has been described with reference to Table 5.

$$n^{(1)}_{PUCCH,i} = (M-i-1) \cdot N_c + i \cdot N_{c+1} + n_{CCE,i} N^{(1)}_{PUCCH} \quad \text{[Equation 4]}$$

Here, c is selected from {0, 1, 2, 3} so that $N_c \leq n_{CCE,i} < N_{c+1}$ is satisfied. $n^{(1)}_{PUCCH}$ is a value set by a higher layer signal. $N_C = \max\{0, \text{floor } [N^{DL}_{RB} \cdot (N^{RB}_{sc} \cdot c - 4)/36]\}$. The $N^{DL}_{RB}$ is a DL bandwidth, and $N^{RB}_{sc}$ is the size of an RB indicated by the number of subcarriers in the frequency domain. $n_{CCE,i}$ is a first CCE number used to send a corresponding PDCCH in the subframe n−$k_i$.

2) If UE receives a PDSCH (i.e., SPS PDSCH) not having a corresponding PDCCH in the subframe, $n^{(1)}_{PUCCH,i}$ is determined by a configuration given by a higher layer signal and Table 7.

If two or more serving cells have been configured in UE in TDD, the UE sends ACK/NACK using channel selection that uses the PUCCH format 1b or the PUCCH format 3. Channel selection that uses the PUCCH format 1b used in TDD can be performed as follows.

If a plurality of serving cells using channel selection that uses the PUCCH format 1b has been configured, when ACK/NACK bits are greater than 4 bits, UE performs spatial ACK/NACK bundling on a plurality of codewords within one DL subframe and sends spatially bundled ACK/NACK bits for each serving cell through channel selection that uses the PUCCH format 1b. Spatial ACK/NACK bundling means the compression of ACK/NACK for each codeword through logical AND operations within the same DL subframe.

If ACK/NACK bits are 4 bits or lower, spatial ACK/NACK bundling is not used and the ACK/NACK bits are transmitted through channel selection that uses the PUCCH format 1b.

If 2 or more serving cells using the PUCCH format 3 have been configured in UE, when ACK/NACK bits are greater than 20 bits, spatial ACK/NACK bundling can be performed in each serving cell and ACK/NACK bits subjected to spatial ACK/NACK bundling can be transmitted through the PUCCH format 3. If ACK/NACK bits are 20 bits or lower, spatial ACK/NACK bundling is not used and the ACK/NACK bits are transmitted through the PUCCH format 3.

<Channel Selection Using the PUCCH Format 1b Used in FDD>

If two serving cells using FDD have been configured in UE, ACK/NACK can be transmitted through channel selection that uses the PUCCH format 1b. The UE can feed ACK/NACK for a maximum of 2 transport blocks, received in one serving cell, back to a BS by sending 2-bit (b(0)b(1)) information in one PUCCH resource selected from a plurality of PUCCH resources. One codeword can be transmitted in one transport block. A PUCCH resource can be indicated by a resource index $n^{(1)}_{PUCCH,i}$. Here, A is any one of {2, 3, 4}, and i is 0≤i≤(A−1). The 2-bit information is indicated as b(0)b(1).

HARQ-ACK(j) indicates an HARQ ACK/NACK response that is related to a transport block or DL SPS release PDCCH transmitted by a serving cell. The HARQ-ACK(j), the serving cell, and the transport block can have the following mapping relationship.

TABLE 8

| | HARQ-ACK(j) | | | |
|---|---|---|---|---|
| A | HARQ-ACK(0) | HARQ-ACK(1) | HARQ-ACK(2) | HARQ-ACK(3) |
| 2 | Transport block 1 of primary cell | Transport block 2 of secondary cell | NA | NA |
| 3 | Transport block 1 of serving cell 1 | Transport block 2 of serving cell 1 | Transport block 3 of serving cell 2 | NA |
| 4 | Transport block 1 of primary cell | Transport block 2 of primary cell | Transport block 3 of secondary cell | Transport block 4 of secondary cell |

In Table 8, for example, in the case of A=4, HARQ-ACK (0) and HARQ-ACK(1) indicate ACK/NACKs for 2 transport blocks transmitted in a primary cell, and HARQ-ACK (2) and HARQ-ACK(3) indicate ACK/NACKs for 2 transport blocks transmitted in a secondary cell.

When UE receives a PDSCH or detects a DL SPS release PDCCH by detecting a PDCCH in a subframe 'n−4' of a primary cell, the UE sends ACK/NACK using a PUCCH resource $n^{(1)}_{PUCCH,i}$. Here, $n^{(1)}_{PUCCH,i}$ is determined to be $n_{CCE,i} + N^{(1)}_{PUCCH}$. Here, $n_{CCE,i}$ means an index of the first CCE that is used to send a PDCCH by a BS, and $N^{(1)}_{PUCCH}$ is a value set through a higher layer signal. If a transmission mode of a primary cell supports up to two transport blocks, a PUCCH resource $n^{(1)}_{PUCCH,i+1}$ is given. Here, $n^{(1)}_{PUCCH,i+1}$ can be determined to be $n_{CCE,i} + 1 + N^{(1)}_{PUCCH}$. That is, if a primary cell is set in a transmission mode in which a maximum of up to 2 transport blocks can be transmitted, 2 PUCCH resources can be determined.

If a PDCCH detected in a subframe 'n−4' of a primary cell is not present, a PUCCH resources $n^{(1)}_{PUCCH,i}$ for sending ACK/NACK for a PDSCH is determined by a higher layer configuration. If up to 2 transport blocks are supported, a PUCCH resource $n^{(1)}_{PUCCH,i+1}$ can be given as $n^{(1)}_{PUCCH,i+1}=n^{(1)}_{PUCCH,i+1}$.

If a PDSCH is received in a secondary cell by detecting a PDCCH in a subframe 'n−4', PUCCH resources $n^{(1)}_{PUCCH,i}$ and $n^{(1)}_{PUCCH,i+1}$ for a transmission mode in which up to 2 transport blocks are supported can be determined by a higher layer configuration.

Hereinafter, the present invention will be described.

As described above, in an LTE system, there are an FDD frame structure and a TDD frame structure. In FDD, a downlink subframe and an uplink subframe are present at different frequencies in each subframe. For example, a downlink subframe may be present in a first frequency band (f1), and an uplink subframe may be present in a second frequency band (f2). Here, downlink subframes are consecutive, and uplink subframes are likewise consecutive.

When a downlink and an uplink have the same size of a frequency band (that is, f1=f2), a ratio of downlink resources to uplink resources is fixed to 1:1. Accordingly, when a downlink/uplink traffic demand is changed or traffic demand is concentrated in either of the downlink and the uplink, the resources may not be efficiently used.

Thus, for FDD, a method of using part of the uplink resources as downlink resources is considered.

Figure 13:
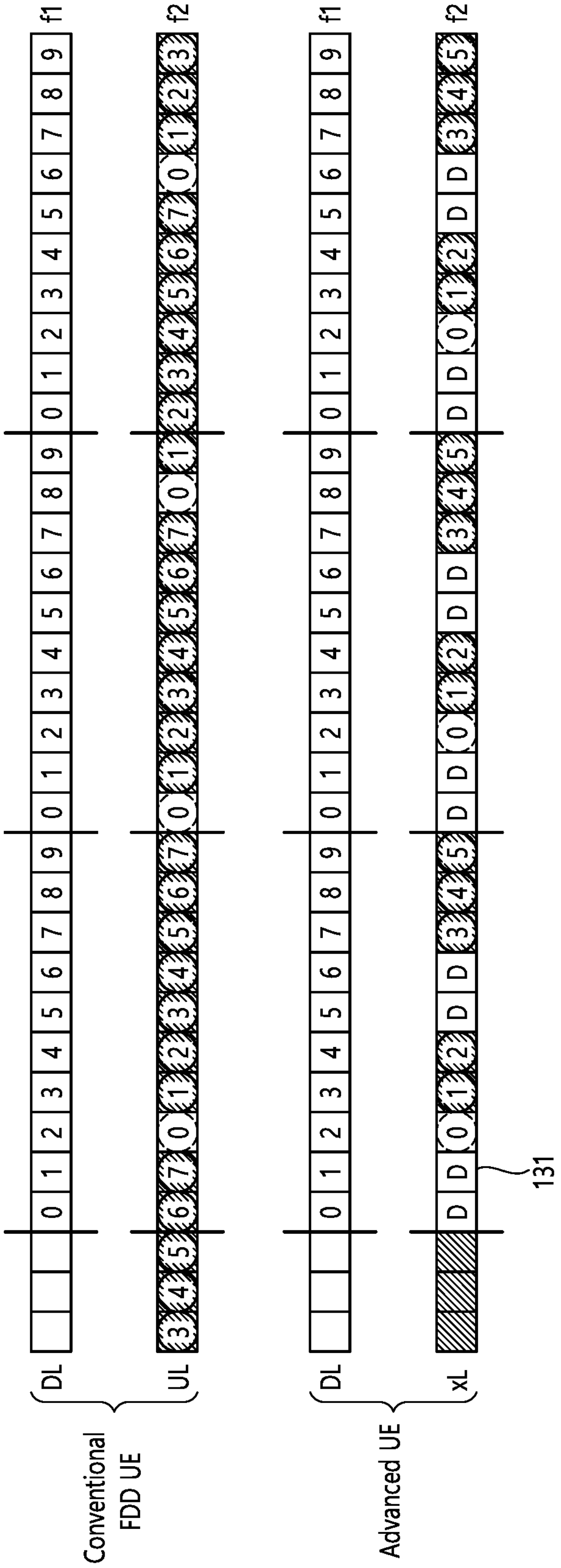
FIG. 13 illustrates a first embodiment of switching part of uplink resources to downlink resources for use.

FIG. 13 illustrates a first embodiment of switching part of uplink resources to downlink resources for use.

Referring to FIG. 13, a legacy FDD UE may use f1 for a downlink and f2 for an uplink.

Meanwhile, an advanced UE uses f1 for a downlink as in the legacy FDD UE. However, the advanced UE not only uses f2, which is used by the legacy FDD UE only for the uplink, for an uplink but may use part of resources (for example, subframes 131 represented by D) in f2 even for a downlink.

As such, the advanced UE may use f2, which is used by the legacy FDD UE only for the uplink, in a divided manner for the uplink and the downlink as necessary. For example, when traffic is concentrated in the downlink and there is little traffic in the uplink, a base station may allocate downlink subframes even for f2 to transmit downlink data. In this case, the base station may notify the UE of a configuration according to the first embodiment. The advanced UE supports the configuration and thus is capable of operating according to the first embodiment.

Figure 14:
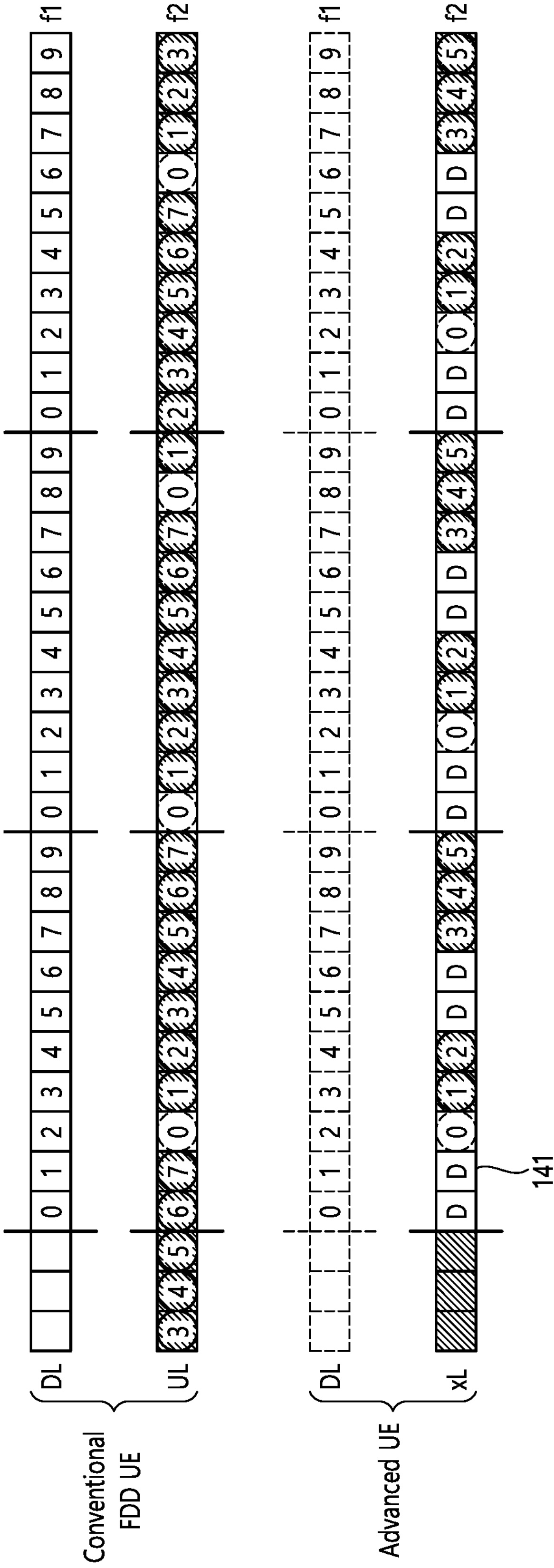
FIG. 14 illustrates a second embodiment of switching part of uplink resources to downlink resources for use.

FIG. 14 illustrates a second embodiment of switching part of uplink resources to downlink resources for use.

Referring to FIG. 14, likewise in FIG. 13, a legacy FDD UE may use f1 for a downlink and f2 for an uplink.

An advanced UE may not use f1. The advanced UE not only uses f2 for an uplink but may use part of resources (for example, subframes 141 represented by D) in f2 even for a downlink.

A base station may notify the UE of a configuration according to the second embodiment.

Defining, as downlink subframe configuration information, information indicating to the advanced UE whether part of subframes in f2, which is used by the legacy UE only for the uplink, are used as downlink subframes, the base station may transmit the downlink subframe configuration information to the advanced UE, specifically through a downlink subframe 141 in f2.

Alternatively the base station may transmit the downlink subframe configuration information to the advanced UE through a downlink subframe in f1. This process may be possible on the assumption that the advanced UE supports carrier aggregation. A UE supporting no carrier aggregation may be allowed to use f1 or use a certain range of f2 switched for TDD in order to receive the downlink subframe configuration information.

The downlink subframe configuration information may be signaled through an RRC message transmitted through a downlink subframe in f1. Alternatively, the downlink subframe configuration information may be signaled through a search space shared between a plurality of UEs, such as a common search space (CSS). The downlink subframe configuration information may indicate whether each subframe is switched a downlink subframe. Alternatively, the downlink subframe configuration information may indicate which pattern is used among configurable patterns determined for a plurality of subframes. For example, a plurality of patterns in which 10 subframes in a frame are allocated as downlink and uplink subframes is determined in advance, and the downlink subframe configuration information may indicate which pattern is used.

<Configuration of Default Uplink Subframe Region in f2>

The advanced UE using f2, used by the legacy UE only for the uplink, for the downlink and the uplink reuses an operation based on an existing TDD UL-DL configuration, thereby reducing complexity in implementation.

Defining determining each subframe in f2 as a downlink subframe or uplink subframe as UL/DL direction determination, it may be considered that UL/DL direction determination follows the existing TDD UL-DL configuration. Here, it is needed to avoid a collision between uplink transmission of the legacy UE, that is, PUCCH, SRS and physical random access channel (PRACH) transmission, and downlink transmission from the base station to the advanced UE. To this end, one of the following methods may be used.

1. First Method

The base station may schedule an uplink channel of the legacy UE not to collide with downlink transmission for the advanced UE. To this end, the base station configures a default uplink frame for uplink channel transmission of the legacy UE for the advanced UE. Particularly, a PRACH transmission target uplink subframe of the legacy UE may be included in the default uplink subframe for the advanced UE.

The default uplink subframe may be selected among subframes configured as uplink subframes in a UL/DL configuration assigned for the advanced UE. Alternatively, the advanced UE may be provided with a UL/DL configuration including the default uplink subframe in advance.

For the advanced UE, subframes in f2 may be configured variably as downlink subframes or uplink subframes. Exceptionally, a subframe designated as the default uplink subframe may not be configured as a downlink subframe.

Meanwhile, a collision between a downlink subframe in the UL/DL configuration and the default uplink subframe may occur due to a signaling error or the like. In this case, the following methods may be considered.

First, the UE may recognize the collision as an error and operate accordingly. Second, the UE may recognize the downlink subframe in the UL/DL configuration as an uplink subframe and operate accordingly.

2. Second Method

The base station may perform downlink channel transmission for the advanced UE only in a region other than a default uplink region for uplink channel transmission for the legacy UE in f2.

Figure 15:
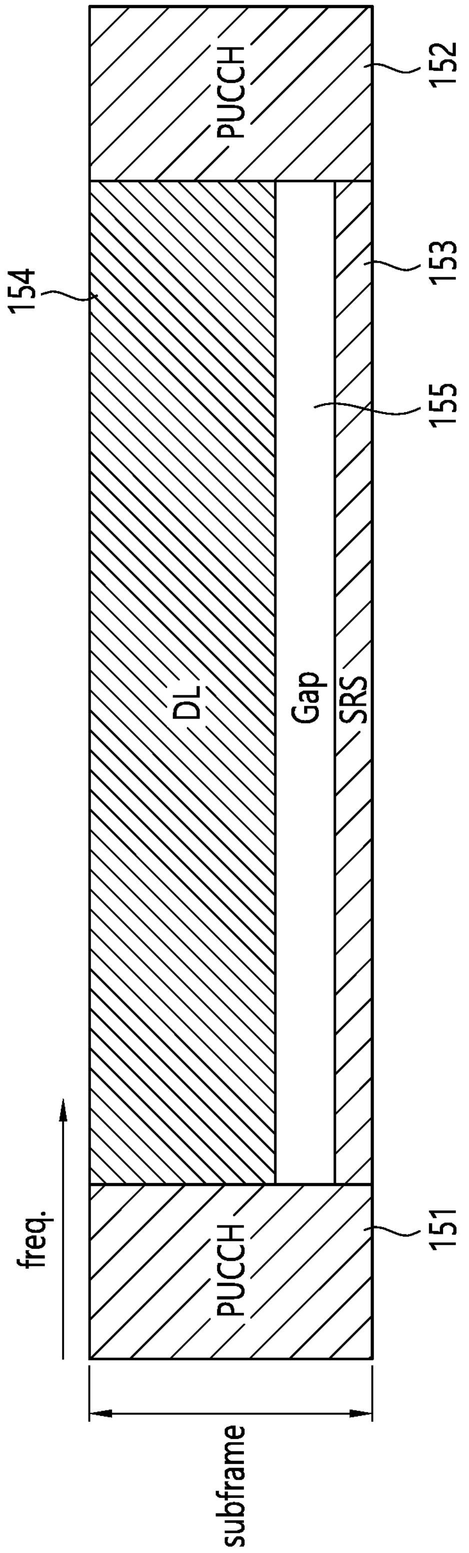
FIG. 15 illustrates a configuration of a subframe allocable to the advanced UE.

FIG. 15 illustrates a configuration of a subframe allocable to the advanced UE. The configuration illustrated in FIG. 15 may be a subframe configuration according to the second method.

Referring to FIG. 15, the legacy UE transmits a PUCCH and an SRS in default uplink regions 151, 152 and 153 in uplink subframes. Downlink transmission for the advanced UE may be performed only in a portion 154 of a region excluding the default uplink regions.

PUCCH regions 151 and 152 for transmitting the PUCCH may be excluded from downlink transmission for the advanced UE by PDSCH scheduling. However, an SRS region 153 for transmitting the SRS is excluded from allocation of downlink OFDM symbols and performs PDSCH data mapping via puncturing or rate-matching.

Excluding the SRS region may be performed only in an SRS transmission subframe in a cell-specific SRS configuration of a legacy uplink. In downlink scheduling, the existence of the SRS transmission region may be signaled directly.

Meanwhile, a PRACH transmission band in a PRACH transmission target uplink subframe may be also configured as a default uplink region in a PRACH configuration of the legacy UE.

In configuring the SRS region, not only OFDM symbols actually used to transmit the SRS but also additional OFDM symbols for a gap needed due to a downlink-to-uplink switch may be excluded from downlink transmission.

<Configuration of Default Downlink Subframe/Region in f2>

If the advanced UE has a specific signal to necessarily receive from the base station in f2, a subframe or region for transmitting the specific signal may be configured as a default downlink subframe/region for the advanced UE.

For example, to receive a downlink signal, the advanced UE needs to perform downlink time/frequency synchronization with the base station. That is, the advanced UE needs to receive a primary synchronization signal (PSS), a secondary synchronization signal (SSS) or a cell-specific reference signal (CRS) for synchronization.

Thus, the subframe/region for transmitting the specific signal may be configured as the default downlink subframe/region.

The advanced UE operating according to the first embodiment may configure only a subframe for transmitting a periodic RS for tracking or a CRS or CSI-RRS for CSI estimation as the default downlink subframe. Alternatively, a tracking/synchronization signal in f1 may be used as it is for downlink subframes in f2.

The advanced UE operating according to the second embodiment may configure a default downlink subframe for a physical broadcast channel for system information transmission.

The default downlink subframe may be selected among downlink subframes in a UL/DL configuration assigned to the advanced UE, or a UL/DL configuration including the default downlink subframe may be transmitted to the advanced UE.

When a PBCH is transmitted in f2, the default downlink subframe may be a subframe predetermined between the base station and the UE. Otherwise, the default downlink subframe may be configured by transmitting an RRC message in f1 or transmitting DCI through a CSS.

<UL/DL Subframe Configuration Cycle>

A synchronization HARQ scheme is applied to PUSCH transmission in conventional FDD. The synchronization HARQ scheme is performed in order of UL grant reception, PUSCH transmission, PHICH reception, and PUSCH retransmission, in which UL grant reception and PHICH reception have a cycle of 8 ms and PUSCH transmission and PUSCH retransmission have a cycle of 8 ms. The reception processes are performed in f1 and the transmission processes are performed in f2.

Thus, in the synchronization HARQ, when an uplink resource is not secured on an 8-ms cycle, retransmission is delayed by a multiple of 8 ms. Thus, it is preferable to design UL/DL configuration such that a pattern of a UL/DL direction for the advanced UE is repeated every 8 ms (or multiples of 8 ms). Likewise, even in use of a 10 ms-cycle UL/DL configuration, it is preferable to configure a default UL/DL cycle of 8 ms (or multiples of 8 ms). For coordination with conventional FDD operations, the UE may be signaled not to use part of UL/DL subframes defined in the TDD UL/DL configuration.

The part of uplink/downlink subframes include a plurality of PRBs in the frequency domain, in which the UE may be signaled not to use all of the PRBs or only part of the PRBs for the downlink or uplink.

When the UE is signaled not to use only part of the PRBs are for the downlink, the UE may assume that PRBs other than the unavailable PRBs are available for the downlink. A remaining region other than the PUCCH regions for the legacy UE may be configured for the downlink.

<DL Scheduling>

When the advanced UE operates according to the first embodiment, since there is an available downlink subframe in f1, scheduling of a downlink subframe in f2 may be performed through a downlink subframe in f1. This is similar to carrier aggregation.

To implement such scheduling, a separate carrier index (CI) is allocated to f2 and a data channel schedule of each carrier is separately coded and forwarded via separate DCI as in cross carrier scheduling. Scheduling for downlink subframes in f1 and scheduling for downlink subframes in f2 are distinguished using a CIF value of DCI.

When only one FDD carrier is used, a CIF may be configured with 1 bit only.

Alternatively, bundled scheduling may be used. For example, as in uplink scheduling in TDD UL-DL configuration 0, bitmaps for a downlink subframe in f1 and a downlink subframe in f2 are allocated to one DCI to indicate whether both the downlink subframe in f1 and the downlink subframe in f2 are scheduled or either thereof is scheduled.

Such a bit field may be added only for a subframe possible for downlink scheduling in f2. Such downlink scheduling may be applied only to a specific TM-dependent DCI format.

When the advanced UE operates according to the first embodiment, the advanced UE, which is configured with cross-carrier scheduling, assumes that a PDSCH starts on OFDM symbol #0. Even when a PDSCH start symbol is not configured as a value of 0 or even before configuration, the advanced UE assumes that a PDSCH starts on OFDM symbol #0.

When the advanced UE operates according to the first embodiment, the advanced UE may assume that no CRS is transmitted in the downlink. Alternatively, when the UE is configured with cross-carrier scheduling or EPDCCH monitoring subframes cover all downlink subframes, the UE may assume that no CRS is transmitted.

In addition, when the advanced UE operates according to the first embodiment, the UE may assume that no CSS is transmitted in a downlink subframe in f2 DL.

<Uplink Scheduling>

In downlink scheduling, since DCI is transmitted in the same subframe where a data channel is transmitted, self-carrier scheduling is possible. In UL scheduling, however, since DCI needs to be transmitted in an appointed downlink subframe before a uplink data channel transmission timing, configuration of a downlink subframe is restricted.

To avoid such restriction, only uplink scheduling using a downlink subframe in f1 may be allowed for the advanced UE, whereas uplink scheduling using a downlink subframe in f2 may not be allowed.

That is, uplink scheduling for the advanced UE is performed in downlink subframes in f1 and uplink subframes in f2 UL by FDD.

When only cross carrier scheduling is allowed, a downlink data channel in f1 may also be configured such that the downlink in f2 is configured to transmit only a PDSCH without transmitting a control channel, such as EPDCCH.

When cross-carrier scheduling is configured, a PUSCH transmission timing of the advanced UE may follow FDD. Further, an HARQ-ACK may also be transmitted according to FDD as in aggregation of two FDD carriers.

On the contrary, although cross-carrier scheduling is configured, an uplink HARQ-ACK, CSI, and PHICH timing may be determined according to a UL/DL configuration of an actual TDD carrier in f2.

<Timing Advance>

Since UEs are at different distances from a base station, when the base station simultaneously transmits downlink signals for the respective UEs, the UEs may have different downlink signal reception timings due to a propagation delay or the like. Further, when the UEs transmit uplink signals based on the downlink signal reception timings, uplink signal transmission timings and timings (arrival timings) of the uplink signals reaching the base station may vary by the UEs.

By adjusting the arrival timings of the uplink signals transmitted by the plurality of UEs to be in a certain range, it is possible to decode uplink OFDM symbols. Thus, to adjust the timings of the uplink signals reaching the base station, a timing advance (TA) value is assigned to each UE to determine an uplink transmission timing as compared to a downlink. A TA represents the length of time an uplink radio frame is transmitted in advance of a downlink radio frame.

Figure 16:
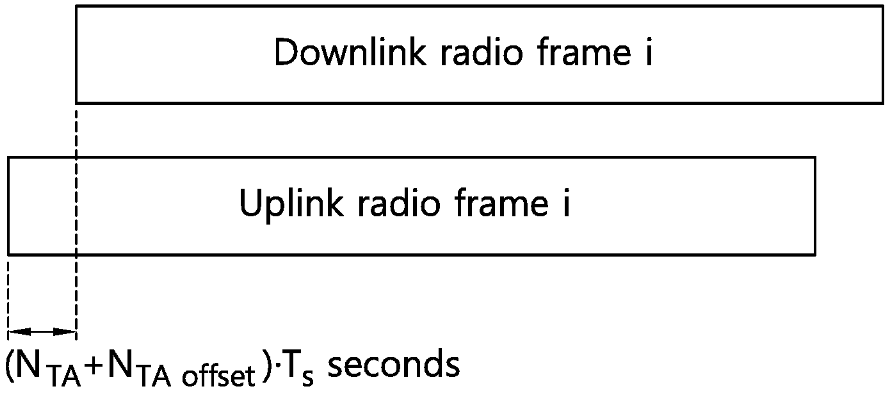
FIG. 16 illustrates an example of assigning a TA value.

FIG. 16 illustrates an example of assigning a TA value.

Referring to FIG. 16, a UE starts transmission of an uplink radio frame i $(N_{TA}+N_{TA\ offset})\times T_S$ seconds before a start timing of a corresponding downlink radio frame i. $N_{TA\ offset}$ may be 0 for FDD, and $N_{TA\ offset}$ may be 624 for TDD. $T_S$ satisfies $307200\times T_S=10$ milli-second (ms). $N_{TA}$ is a value signaled as an absolute value or relative value (increment) from a base station to the UE, and $N_{TA\ offset}$ is a value preset between the base station and the UE according to a duplexing mode (that is, FDD or TDD) of a corresponding frequency.

In TDD, since a downlink and an uplink use the same frequency band, a downlink subframe and an uplink subframe may overlap due to TA assignment. To avoid subframe overlapping, a gap as a guard interval may be applied to a portion which changes from the downlink to the uplink.

A subframe in frequency band f2, used by an existing UE as an uplink subframe, may be used by an advanced UE as a dedicated downlink subframe. Here, a gap may be applied to a last portion of the dedicated downlink subframe or a first portion of an uplink subframe following the dedicated downlink subframe. It is preferable that the gap is applied to the last portion of the dedicated downlink subframe considering that the uplink subframe is used by the existing UE.

Thus, use of a part of OFDM symbols in the downlink subframe used by the advanced UE in frequency band f2 may be limited in order to apply the gap. Further, although consecutive downlink subframes are configured for the advanced UE in frequency band f2, if these downlink subframes can be allocated to the existing UE as uplink subframes, the gap may be applied to all of the downlink subframes.

Here, the gap may not be applied to a downlink subframe preceding a downlink subframe of the advanced UE completely excluding use of an uplink subframe of the existing UE.

When the advanced UE transmits an uplink subframe in frequency band f2, a TA reference may be a downlink subframe in frequency band f1 or a downlink subframe in frequency band f2. Using the downlink subframe in frequency band f1 as the reference is useful particularly when PUSCHs are scheduled by FDD, since frequency band f1 enables estimation of secure downlink synchronization. The latter case is useful when a channel in frequency band f2 is significantly different in characteristics from a channel in frequency band f1 and is useful for a UE receiving only a downlink in frequency band f2.

Meanwhile, even when a UE receives a TDD UL-DL configuration to operate in TDD, $N_{TA\ offset}=0$ may be applied instead of $N_{TA\ offset}$ of 624, which is for matching a TA with a UE operating in FDD and may be applied for PRACH transmission.

When the advanced UE and the existing UE which respectively use frequency band f2 for the downlink and the uplink coexist, $N_{TA}$ of the existing UE is set such that $624\leq N_{TA}\leq 20512$ so that the downlink and the uplink do not overlap. This is useful when $N_{TA\ offset}=624$ is applied to the advanced UE.

When the advanced UE has $N_{TA\ offset}=624$, it is possible to apply an offset so that a downlink transmission timing in frequency band f2 is slightly in advance as compared with in frequency band f1.

Figure 17:
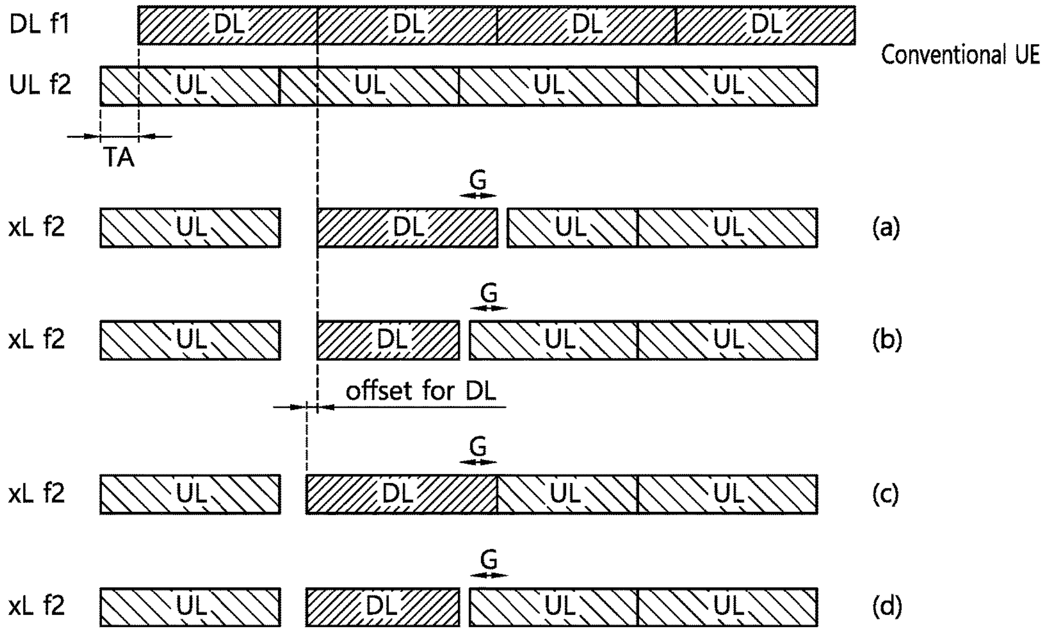
FIG. 17 illustrates an example of a TA for an existing UE in FDD and a TA for an advanced UE.

FIG. 17 illustrates an example of a TA for an existing UE in FDD and a TA for an advanced UE.

Referring to FIG. 17, in the existing UE, an uplink transmission timing in frequency band f2 precedes a downlink reception timing in frequency band f1 by TA.

Referring to FIG. 17 (*a*) to (*d*), in the advanced UE, both uplink transmission and downlink reception are possible in frequency band f2. When subframes are positioned in order of a downlink subframe and an uplink subframe in frequency band f2, a gap (represented by G) may be included in the downlink subframe (FIGS. 17 (*a*) and (*c*)) or in the uplink subframe (FIGS. 17 (*b*) and (*d*)).

As illustrated in FIGS. 17 (*c*) and (*d*), downlink transmission from a base station to the advanced UE may be performed by an offset value in advance as compared with the existing UE.

A TA is applied for uplink synchronization of a UE. Thus, the same idea may be applied for uplink synchronization of a UE using aggregation of an FDD cell and a TDD cell. That is, a UE using aggregation of an FDD cell and a TDD cell uses a TA offset ($N_{TA\ offset}$) of the FDD cell as a TA offset ($N_{TA\ offset}$) of the TDD cell or uses the TA offset ($N_{TA\ offset}$) of the TDD cell as the TA offset ($N_{TA\ offset}$) of the FDD cell.

When a first cell is a primary cell, a second cell is a secondary cell, and the first and second cells are configured for a UE, the UE may determine TA values for the first and second cells using a combination of a value ($N_{TA,primarycell}$)

based on a value signaled from the primary cell and an offset value ($N_{TA\ offset,primarycell}$) predetermined according to a duplexing mode of the primary cell.

1. When an FDD cell and a TDD cell are included not in the same timing advance group (TAG) but in different TAGs Since $N_{TA\ offset}$ is defined differently for an FDD cell and a TDD cell, there is a need for a method of achieving uplink synchronization at the UE with downlink synchronization between the two cells being achieved.

One method is to divide the FDD cell and the TDD cell to belong to different TAGs all the time. In the case of carrier aggregation of the FDD cell and the TDD cell, $N_{TA}$ is independently allocated the FDD cell and the TDD cell to configure a TA. Even when $N_{TA\ offset,TDD}$=624 is applied to the TDD cell and $N_{TA\ offset,FDD}$=0 is applied to the FDD cell as conventionally, uplink synchronization may be achieved by setting an $N_{TA}$ relationship between the FDD cell and the TDD cell to $N_{TA,FDD}=N_{TA,TDD}+624$, with downlink synchronization achieved.

Meanwhile, when the TDD cell and the FDD cell have similar channel environments and thus have the same channel propagation delay, if the cells are operated in a plurality of TAGs merely to compensate for $N_{TA\ offset}$ between the two cells, it may be needed to transmit a separate PRACH to each TAG to compensate for a TA value.

Thus, there may be used a method in which even when the cells are operated in a plurality of TAGs, a part of the TAGs configure a TA value based on a transmitted PRACH of a reference TAG, without transmitting a PRACH. For example, each TAG has a timer (time alignment timer) indicating when cells in the TAG applies a timing according to the TAG until. This timer may function as the reference TAG. The reference TAG may be a TAG including the primary cell, and the primary cell may be a reference cell. Accordingly, unnecessary PRACH transmission may be avoided.

Meanwhile, when the TDD cell and the FDD cell have different channel propagation delays due to different channel environments, different TAGs may be configured for the cells. Thus, it is needed to allow TAGs to determine whether to refer the PRACH of the reference TAG, instead of necessarily referring to the PRACH of the reference TAG.

2. When an FDD Cell and a TDD Cell Coexist in the Same TAG

In the case of carrier aggregation of an FDD cell and a TDD cell, if the cells have similar channel environments and thus have the same channel propagation delay, it is appropriate to operate the cells in the same TAG in order to avoid unnecessary signaling. However, since $N_{TA\ offset,TDD}$=624 is applied to the TDD cell and $N_{TA\ offset,FDD}$=0 is applied to the FDD cell, there is needed a method for achieving uplink synchronization with downlink synchronization being achieved between the two cells.

One solution is to apply $N_{TA\ offset}$ defined for one cell to another cell. In the case of a TAG including a primary cell (or in the presence of a single TAG only), it is preferable that only the primary cell transmits a PRACH and an PRACH transmission timing is determined regardless of an added secondary cell. Thus, $N_{TA\ offset}$ of the primary cell is applied to the secondary cell.

A PRACH is transmitted at a timing of $(N_{TA\ offset})\times T_S$ with $N_{TA}$=0. Thus, when $N_{TA\ offset}$ is changed, if an error occurs in configuration of a secondary cell, an error may occur in TA estimation.

In the case of carrier aggregation of an FDD primary cell and a TDD secondary cell, the same $N_{TA\ offset}$=0 may be applied to the FDD primary cell and $N_{TA\ offset}$=0 may be applied to the TDD secondary cell, instead of $N_{TA\ offset}$=624.

In the case of carrier aggregation of a TDD primary cell and an FDD secondary cell, the same $N_{TA\ offset}$=624 may be applied to the TDD primary cell and $N_{TA\ offset}$=624 may be applied to the FDD secondary cell, instead of $N_{TA\ offset}$=0.

When an FDD cell and a TDD cells coexist in the same TAG including no primary cell (that is, an FDD secondary cell and a TDD secondary cells coexist), a cell instructed to transmit a PRACH maintains $N_{TA\ offset}$ defined according to a frame structure of the cell as it is. A cell receiving no instruction to transmit a PRACH adopts $N_{TA\ offset}$ of the cell instructed to transit the PRACH.

Alternatively, $N_{TA\ offset}$ of a cell having a specific CI value (for example, a reference CI value, minimum CI value or maximum CI value) may be applied in a corresponding TAG.

Alternatively, $N_{TA\ offset}$ applied to a primary cell may be applied.

In a TAG configured for a small cell, $N_{TA\ offset}$ of a secondary primary cell defined for the small cell may be applied. The secondary primary cell is a cell configured to operate similarly to a primary cell in a dual connectivity situation. For example, the secondary primary cell may be a cell transmitting a PUCCH to a cell other than a primary cell.

Alternatively, $N_{TA\ offset}$ to be applied to a TAG may be directly set. $N_{TA\ offset}$ used to calculate an uplink TA value of the TAG may be determined according to a last cell transmitting a PRACH in the same TAG. Alternatively, $N_{TA\ offset}$ may be determined according to a cell having a specific CI value. Alternatively, $N_{TA\ offset}$ may be determined according to a primary cell or a directly applied type (or $N_{TA\ offset}$) may be indicated.

Figure 18:
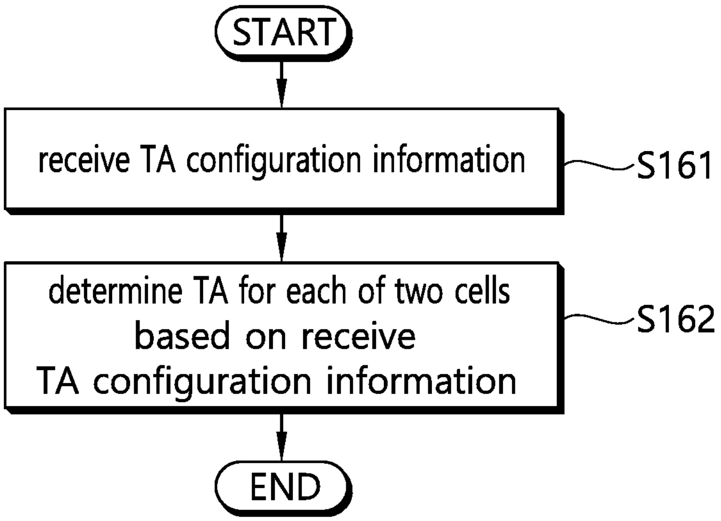
FIG. 18 illustrates a method of determining a TA of a UE having a plurality of cells configured therefor.

FIG. 18 illustrates a method of determining a TA of a UE having a plurality of cells configured therefor.

Referring to FIG. 18, the UE receives TA configuration information from a base station (S161).

The TA configuration information is also referred to as a TA command. The TA configuration information (TA command) may be assigned for each TAG. TA configuration information for one TAG may indicate an uplink timing variance with respect to a current uplink timing of the TAG.

The UE determines a TA for each of a plurality of cells, for example, two cells, based on the TA configuration information (S162). The two cells may be a part of the plurality of cells.

For example, when TA configuration information (TA command) for a TAG including a primary cell is received, the UE adjusts an uplink transmission timing for a PUCCH/PUSCH/SRS of the primary cell based on the received TA configuration information. When a secondary cell and the primary cell belong to the same TAG, an uplink transmission timing for a PUSCH/SRS of the secondary cell is set the same as that for the primary cell.

When TA configuration information (TA command) for a TAG including no primary cell is received, if all serving cells included in the TAG have the same frame structure (that is, all serving cells have either of an FDD frame structure and a TDD frame structure), the UE adjusts uplink transmission timings for PUSCH/SRSs of all the secondary cells in the TAG based on the received TA configuration information and sets the same uplink transmission timing for PUSCH/SRSs for all the secondary cells in the TAG.

Alternatively, when TA configuration information (TA command) for a TAG including no primary cell is received, if all serving cells included in the TAG have different frame structures (that is, some serving cells use a TDD frame structure and others use an FDD frame structure), the UE sets a TA based on the received TA configuration information, defining $N_{TA\ offset}$ as 624 regardless of the frame structures of the serving cells. That is, the UE applies $N_{TA\ offset}$ of 624, used for a cell using a TDD frame, to all the serving cells in the TAG regardless of the frame structures. Here, the same uplink transmission timing for a PUSCH/SRS is set for all the secondary cells in the TAG.

As described above with reference to FIG. 16, a TA represents the length of time an uplink frame is transmitted in advance of a downlink frame.

Defining two cells as a first cell and a second cell, the first cell may be an FDD cell and the second cell may be a TDD cell. In this case, a TA applied to the first cell may be applied to the second cell. For example, when the first cell is a primary cell and the second cell is a secondary cell, a TA value of the primary cell may be applied to the secondary cell.

Both the first cell and the second cell may be secondary cells. In this case, a TA value applied to the TDD cell may also be applied to the FDD cell.

Meanwhile, a TAG including a primary cell may be configured to include both the FDD cell and the TDD cell, and a TAG including no primary cell may be configured such that the FDD cell and the TDD cell do not coexist.

Alternatively, downlink transmissions of the two cells may be performed by applying an offset so that subframe boundaries are not matched. That is, downlink transmission of the FDD cell may be performed by $N_{TA\ offset} \times T_S = 624 \times T_S$ in advance of the TDD cell.

According to the present invention, an advanced UE may borrow part of subframes in a frequency band dedicated to the uplink in conventional FDD for the downlink. Also, the advanced UE may effectively coexist with the conventional FDD UE.

Figure 19:
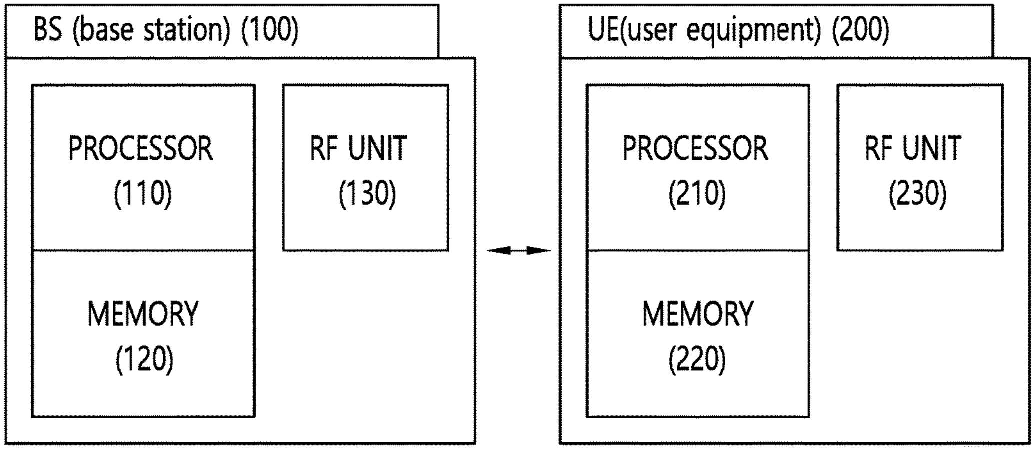
FIG. 19 is a block diagram of a wireless apparatus in which the embodiments of the present invention is implemented.

FIG. 19 is a block diagram of a wireless apparatus in which the embodiments of the present invention is implemented.

A base station 100 includes a processor 110, a memory 120 and a radio frequency (RF) unit 130. The processor 110 implements the proposed functions, processed, and/or methods. The memory 120 is connected to the processor 110 and configured to store various information used for the operations for the processor 110. The RF unit 130 is connected to the processor 110 and configured to transmit and/or receive a radio signal.

A UE 200 includes a processor 210, a memory 220, and a RF unit 230. The processor 210 implements the proposed functions, processed, and/or methods. The memory 220 is connected to the processor 210 and configured to store various information used for the operations for the processor 210. The RF unit 230 is connected to the processor 210 and configured to transmit and/or receive a radio signal.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process, function, etc.) for performing the above-described function. The module may be stored in the memory 120, 220 and executed by the processor 110, 210. The memory 120, 220 may be placed inside or outside the processor 110, 210 and connected to the processor 110, 210 using a variety of well-known means.

What is claimed is:

1. A method for determining an uplink transmission timing of a user equipment configured with a plurality of cells in a wireless communication system, the method comprising:

receiving timing advance (TA) configuration information; and upon reception of the TA configuration information, determining an uplink transmission time for each of two cells among the plurality of cells, wherein the two cells are included in a group, and wherein:

i) when the two cells are a first cell using a frequency division duplex (FDD) frame structure and a second cell using a time division duplex (TDD) frame structure, and when the group includes only secondary cells, both the uplink transmission time of the first cell and the uplink transmission time of the second cell are determined by applying a same offset value regardless of the frame structures of the first cell and the second cell, and the same offset value is an offset value applied to a cell using the TDD frame structure, and ii) when the two cells are the first cell using an FDD frame structure and the second cell using a TDD frame structure and when the group includes a primary cell, an uplink transmission time of the primary cell is determined on the basis of the TA configuration information, and both the uplink transmission time of the first cell and the uplink transmission time of the second cell are determined to be the same as the uplink transmission time of the primary cell.

2. The method of claim 1, wherein the primary cell is a serving cell to which a physical uplink control channel (PUCCH) is transmitted.

3. The method of claim 1, wherein both the first cell and the second cell are secondary cells.

4. A user equipment configured with a plurality of cells in a wireless communication system, the user equipment comprising:

a transceiver configured to transmit and receive a radio signal; and a processor, operatively connected to the, wherein the processor receives timing advance (TA) configuration information, and, upon reception of the TA configuration information, determines an uplink transmission time for each of two cells among the plurality of cells, wherein the two cells are included in a group, and wherein:

i) when the two cells are a first cell using a frequency division duplex (FDD) frame structure and a second cell using a time division duplex (TDD) frame structure and when the group includes only secondary cells, both the uplink transmission time of the first cell and the uplink transmission time of the second cell are determined by applying a same offset value regardless of the frame structure of the first cell and the second cell, and the same offset value is an offset value applied to a cell using the TDD frame structure, and ii) when the two cells are the first cell using an FDD frame structure and the second cell using a TDD frame structure and when with the group includes a primary cell, an uplink transmission time of the primary cell is determined on the basis of the TA configuration information, and both the uplink transmission time of the first cell and the uplink transmission time of the second cell are determined to be the same as the uplink transmission timing of the primary cell.

5. The user equipment of claim 4, wherein the primary cell is a serving cell to which a physical uplink control channel (PUCCH) is transmitted.

6. The user equipment of claim 4, wherein both the first cell and the second cell are secondary cells.

* * * * *

UNITED STATES PATENT AND TRADEMARK OFFICE
CERTIFICATE OF CORRECTION

PATENT NO. : 10,117,208 B2
APPLICATION NO. : 14/915987
DATED : October 30, 2018
INVENTOR(S) : Dongyoun Seo et al.

It is certified that error appears in the above-identified patent and that said Letters Patent is hereby corrected as shown below:

In the Claims

Column 28, Line 44, change "a processor, operatively connected to the," to --a processor, operatively connected to the transceiver,--

Signed and Sealed this
Nineteenth Day of May, 2020

Andrei Iancu
*Director of the United States Patent and Trademark Office*